(12) United States Patent
Park et al.

(10) Patent No.: US 11,694,074 B2
(45) Date of Patent: Jul. 4, 2023

(54) INTEGRATED CIRCUIT THAT EXTRACTS DATA, NEURAL NETWORK PROCESSOR INCLUDING THE INTEGRATED CIRCUIT, AND NEURAL NETWORK DEVICE

(71) Applicant: Samsung Electronics Co., Ltd., Suwon-si (KR)

(72) Inventors: Jun-seok Park, Hwaseong-si (KR); Jin-ook Song, Seongnam-si (KR); Jae-gon Lee, Seongnam-si (KR); Yun-kyo Cho, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 935 days.

(21) Appl. No.: 16/511,073

(22) Filed: Jul. 15, 2019

(65) Prior Publication Data

US 2020/0082253 A1 Mar. 12, 2020

(30) Foreign Application Priority Data

Sep. 7, 2018 (KR) ........................ 10-2018-0107391

(51) Int. Cl.
*G06F 17/10* (2006.01)
*G06N 3/08* (2023.01)
*G06N 3/063* (2023.01)
*G06N 3/04* (2023.01)
*G06F 13/16* (2006.01)

(52) U.S. Cl.
CPC ........... *G06N 3/08* (2013.01); *G06F 13/1673* (2013.01); *G06N 3/04* (2013.01); *G06N 3/063* (2013.01)

(58) Field of Classification Search
CPC ............ G06N 3/08; G06N 3/04; G06N 3/063; G06N 3/0445; G06N 3/0472; G06N 3/0454; G06F 13/1673
See application file for complete search history.

(56) References Cited

U.S. PATENT DOCUMENTS

| 7,747,070 B2 | 6/2010 | Puri |
| 7,978,914 B2 | 7/2011 | Beikirch et al. |
| 9,665,799 B1 | 5/2017 | Munteanu et al. |
| 9,805,303 B2 | 10/2017 | Ross et al. |
| 10,521,696 B2 | 12/2019 | Yang |

(Continued)

FOREIGN PATENT DOCUMENTS

| CN | 106250103 A | 12/2016 | |
| CN | 107240102 A * | 10/2017 | ............... G06T 7/11 |

(Continued)

OTHER PUBLICATIONS

Korean Office Action dated Apr. 20, 2023.

*Primary Examiner* — Xin Jia
(74) *Attorney, Agent, or Firm* — Harness, Dickey & Pierce, P.L.C.

(57) ABSTRACT

An integrated circuit included in a device for performing a neural network operation includes a buffer configured to store feature map data in units of cells each including at least one feature, wherein the feature map data is for use in the neural network operation; and a multiplexing circuit configured to receive the feature map data from the buffer, and output extracted data by extracting feature data of one of features that are included within a plurality of cells in the received feature map data, the features each corresponding to an identical coordinate value.

9 Claims, 21 Drawing Sheets

(56) References Cited

U.S. PATENT DOCUMENTS

| | | | |
|---|---|---|---|
| 2017/0103299 A1 | 4/2017 | Aydonat et al. | |
| 2017/0169327 A1 | 6/2017 | Nestler et al. | |
| 2017/0323196 A1 | 11/2017 | Gibson et al. | |
| 2018/0129935 A1* | 5/2018 | Kim | G06N 3/082 |
| 2018/0157940 A1 | 6/2018 | Yang et al. | |
| 2018/0165575 A1 | 6/2018 | Henry et al. | |

FOREIGN PATENT DOCUMENTS

| | | | |
|---|---|---|---|
| KR | 10-2018-0073314 A | 7/2018 | |
| WO | WO-2015177268 A1 * | 11/2015 | G06K 9/00127 |

\* cited by examiner

FIG. 8A

| D11 (from Cell_6) | D12 (from Cell_5) | D13 (from Cell_5) | D14 (from Cell_5) |
|---|---|---|---|
| D21 (from Cell_2) | D22 (from Cell_1) | D23 (from Cell_1) | D24 (from Cell_1) |
| D31 (from Cell_2) | D32 (from Cell_1) | D33 (from Cell_1) | D34 (from Cell_1) |
| D41 (from Cell_2) | D42 (from Cell_1) | D43 (from Cell_1) | D44 (from Cell_1) |

< D1 >

| D22 (from Cell_1) | D23 (from Cell_1) | D24 (from Cell_1) | D21 (from Cell_2) |
|---|---|---|---|
| D32 (from Cell_1) | D33 (from Cell_1) | D34 (from Cell_1) | D31 (from Cell_2) |
| D42 (from Cell_1) | D43 (from Cell_1) | D44 (from Cell_1) | D41 (from Cell_2) |
| D12 (from Cell_5) | D13 (from Cell_5) | D14 (from Cell_5) | D11 (from Cell_6) |

< To Be Data_ext >

INTEGRATED CIRCUIT THAT EXTRACTS DATA, NEURAL NETWORK PROCESSOR INCLUDING THE INTEGRATED CIRCUIT, AND NEURAL NETWORK DEVICE

CROSS-REFERENCE TO RELATED PATENT APPLICATION

This application claims the benefit of Korean Patent Application No. 10-2018-0107391, filed on Sep. 7, 2018, in the Korean Intellectual Property Office, the disclosure of which is incorporated herein in its entirety by reference.

BACKGROUND

The inventive concepts relate to integrated circuits (ICs), neural network processors, and neural network devices, and more particularly, to ICs for extracting data that is necessary for a neural network operation, a neural network processor, and a neural network device.

A neural network refers to a computational architecture that models a biological brain. Recently, as neural network technologies develop, studies are actively being performed in which various kinds of electronic systems analyze input data and extract valid information by using a neural network device using one or more neural network models.

Neural network devices require a huge number of operations with respect to complex input data. Accordingly, to allow neural network devices to analyze an input in real time and extract information, technology which may efficiently process a neural network operation is required.

Because neural network devices need to perform operations on complex input data, there is a need for a method and apparatus for effectively extracting data necessary for a neural network operation from an enormous amount of complex input data by using a smaller number of resources and/or smaller power consumption.

SUMMARY

The inventive concepts provide a method and apparatus for efficiently extracting data necessary for a neural network operation by using a smaller number of resources and/or smaller power consumption in integrated circuits (ICs), neural network processors, and neural network devices.

According to an aspect of the inventive concepts, there is provided an integrated circuit included in a device for performing a neural network operation, the integrated circuit comprising: a buffer configured to store feature map data in units of cells each including at least one feature, wherein the feature map data is for use in the neural network operation; and a multiplexing circuit configured to receive the feature map data from the buffer, and output extracted data by extracting feature data of one of features that are included within a plurality of cells in the received feature map data, the features each corresponding to an identical coordinate value.

The multiplexing circuit may include a first multiplexing circuit including a multiplexer for extracting feature data of one of features included in the plurality of cells and each corresponding to a first coordinate value, and configured to output first data based on the extracted feature data; and a second multiplexing circuit including a plurality of multiplexers for receiving the first data from the first multiplexing circuit and rotating the received first data in a vertical direction or a horizontal direction.

According to another aspect of the inventive concepts, there is provided a data processing method performed by a neural network processor configured to perform a neural network operation, the data processing method including storing feature map data for the neural network operation in units of cells each including at least one feature; and generating first data having a matrix form by extracting feature data of one of features included in a plurality of cells included in the feature map data, the features each corresponding to an identical coordinate value, for a plurality of coordinate values; generating extracted data for use in the neural network operation by rearranging rows and/or columns of the first data; and performing the neural network operation by using the extracted data, wherein the performing of the neural network operation is performed by an arithmetic circuit.

According to another aspect of the inventive concepts, there is provided a neural network device configured to perform a neural network operation, the neural network device including at least one Intellectual Property (IP); and a neural network processor configured to communicate with the at least one IP via a system bus and output an information signal by performing the neural network operation including a convolution operation, based on input data provided by the at least one IP, wherein the neural network processor is configured to divide the input data into a plurality of cells, store the input data as an input feature map, and generate extracted data for use in the convolution operation by extracting feature data of one of features that are included in the plurality of cells, the features each corresponding to a first coordinate value.

According to another aspect of the inventive concepts, there is provided an integrated circuit included in a device for performing a neural network operation by using extracted data extracted from feature map data, the integrated circuit including a buffer configured to store the feature map data in units of cells each including at least one feature; a first multiplexing circuit configured to extract first data from the feature map data by using a number of multiplexers that is less than or equal to the number of the at least one feature included in each cell, wherein the first data includes all of pieces of feature data included in the extracted data; and a second multiplexing circuit configured to generate the extracted data by rearranging rows and/or columns of the first data by using a number of multiplexers that is less than or equal to a sum of a number of rows of the first data and a number of columns of the first data.

BRIEF DESCRIPTION OF THE DRAWINGS

Example embodiments of the inventive concepts will be more clearly understood from the following detailed description taken in conjunction with the accompanying drawings in which:

FIGS. 8A and 8B illustrate pieces of data in a matrix form so as to explain rotation of first data;

DETAILED DESCRIPTION OF EMBODIMENTS

Hereinafter, the inventive concepts will be described more fully with reference to the accompanying drawings, in which example embodiments of the inventive concepts are shown.

Figure 1:
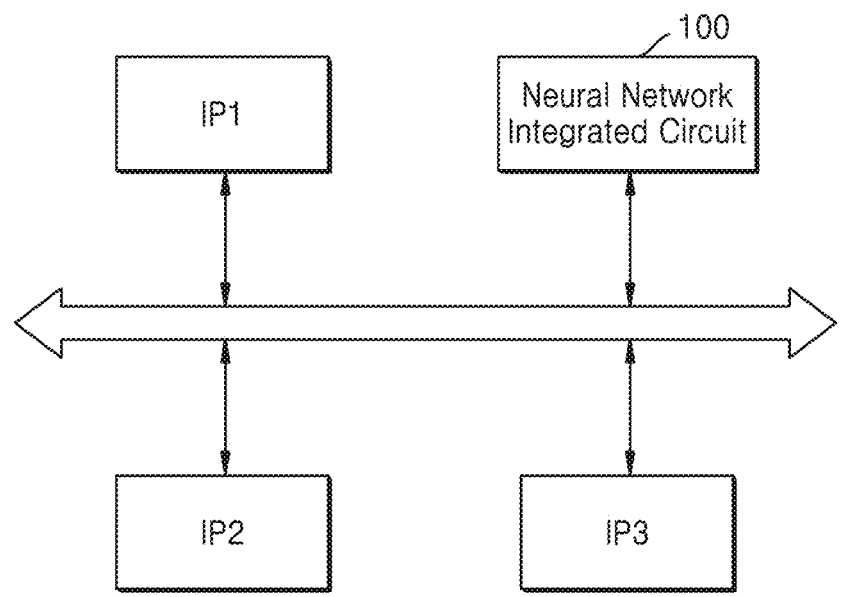
FIG. 1 is a block diagram of a neural network device according to an embodiment of the inventive concepts.

FIG. 1 is a block diagram of a neural network device 10 according to an embodiment of the inventive concepts. The neural network device 10 may include one or more intellectual properties (IPs) and/or a neural network integrated circuit (IC) 100. For example, the neural network device 10 may include first through third IPs IP1 through IP3 and the neural network IC 100. The neural network device 10 may be designed to perform various functions in a semiconductor system, and for example, the neural network device 10 may be an application processor. The neural network device 10 may analyze input data in real time based on a neural network and extract valid information, and based on the extracted valid information, may determine situations or control at least one of the IPs. For example, the neural network device 10 may be used in drones, robot apparatuses (such as advanced driver assistance systems (ADASs)), smart televisions (TVs), smartphones, medical devices, mobile devices, image display devices, measuring devices, Internet of Things (IoT) devices, etc., and in addition, may be used in at least one of various kinds of electronic devices.

The neural network device 10 may include various kinds of IPs. For example, the IPs may include a processing unit, a plurality of cores included in the processing unit, Multi-Format Codec (MFC), a video module (e.g., a camera interface, a Joint Photographic Experts Group (JPEG) processor, a video processor, or a mixer), a three-dimensional (3D) graphic core, an audio system, a driver, a display driver, volatile memory, non-volatile memory, a memory controller, input and output interface blocks, and/or cache memory. Each of the first through third IPs IP1 through IP3 may include at least one of various kinds of IPs.

Examples of a technique for connecting IPs involve a connection method based on a system bus. For example, an Advanced Microcontroller Bus Architecture (AMBA) protocol by the Advanced RISC Machine (ARM) may be applied as a standard bus specification. Examples of bus types of the AMBA protocol may include an Advanced High-Performance Bus (AHB), an Advanced Peripheral Bus (APB), an Advanced eXtensible Interface (AXI), AXI4, and AXI Coherency Extensions (ACE). The AXI from among the above-described bus types is an interface protocol between IPs and may provide a multiple outstanding address function, a data interleaving function, etc. Besides them, other types of protocols, such as uNetwork by SONICs Inc., CoreConnect by IBM, and an Open Core Protocol by OCP-IP, are applicable to a system bus.

The neural network IC 100 may generate the neural network, may train (or learn) the neural network, may perform a computation based on received input data and generate an information signal based on a result of the computation, or may retrain the neural network. The neural network may include various types of models, such as a convolution neural network (CNN) (e.g., GoogleNet, AlexNet, and VGG Network), a region with a convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, and a classification network, but embodiments are not limited thereto. The neural network IC 100 may include one or more processors for performing a computation according to the models of the neural network. The neural network IC 100 may also include a special memory (not shown) for storing programs corresponding to the models of the neural network. The neural network IC 100 may be referred to as a neural network processing device, a neural network processor, a neural network processing unit (NPU), or the like.

The neural network IC 100 may receive various kinds of input data from the one or more IPs via the system bus, and may generate an information signal based on the input data. For example, the neural network IC 100 may generate the information signal by performing a neural network operation on the input data, and the neural network operation may include a convolution operation. A convolution operation of the neural network IC 100 will be described later in detail with reference to FIGS. 4A and 4B. The information signal generated by the neural network IC 100 may include one of various kinds of recognition signals such as a voice recognition signal, an object recognition signal, an image recognition signal, and/or a bio-information recognition signal. For example, the neural network IC 100 may receive frame data included in a video stream as input data, and may generate, from the frame data, a recognition signal regarding an object included in an image represented by the frame data. However, embodiments are not limited thereto, and the neural network IC 100 may receive various kinds of input data and may generate a recognition signal according to the input data.

Figure 2:
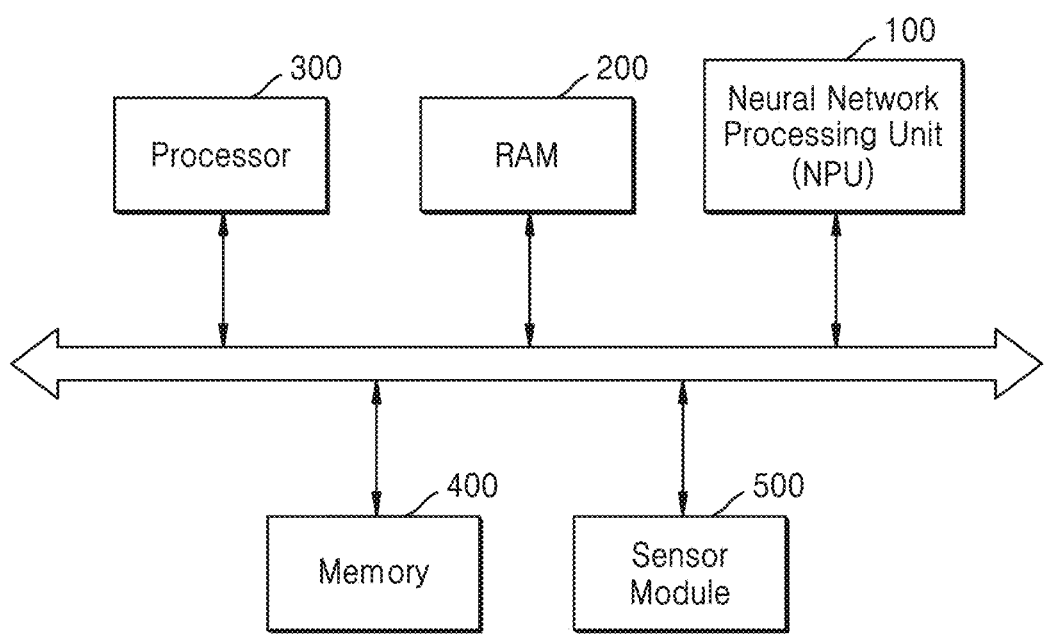
FIG. 2 is a block diagram of a neural network device according to an embodiment of the inventive concepts.

In the neural network device 10 according to an embodiment of the inventive concepts, the neural network IC 100 may store input feature map data in a buffer in units of cells, based on the input data provided by the one or more IPs. Each cell may include at least one feature. The neural network IC 100 may generate input extracted data by extracting feature data of one of features which each correspond to an identical coordinate value and are respectively included in a plurality of cells included in the input feature map data. In other words, the neural network IC 100 may generate a value corresponding to a first coordinate value of the input extracted data by extracting feature data of one of features that are respectively included in the plurality of cells and correspond to the first coordinate value. According to an embodiment, the neural network IC 100 may generate first data based on the extracted feature data, and may generate the input extracted data by rotating the first data in a vertical direction and/or a horizontal direction. The neural network IC 100 may perform convolution by multiplying the input extracted data by a weight value. As described above, the neural network IC 100 may extract data necessary for a computation by using small-sized multiplexers by extracting feature data of one of features that are respectively included in the plurality of cells, the features each corresponding to an identical coordinate value. Accordingly, a data extraction speed of the neural network IC 100 may increase, and power consumption for data extraction may be reduced. Furthermore, an operating speed of the neural network device 10 may increase, or the neural network device 10 may consume less power. In detail, because the neural network IC 100 may be implemented with a small number of multiplexers compared with the conventional art, the neural network IC 100 may reduce the area occupied by multiplexers when being implemented as a chip, and accordingly is beneficial in terms of design. FIG. 2 is a block diagram of a neural network device 10 according to an embodiment of the inventive concepts. In particular, FIG. 2 is an example embodiment of the neural network device 10 of FIG. 1. Accordingly, descriptions of the neural network device 10 that are the same as those made with reference to FIG. 1 are not repeated herein.

The neural network device 10 may include a random access memory (RAM) 200, a processor 300, a memory 400, and/or a sensor module 500.

According to an embodiment, the neural network IC 100 may be an NPU.

The RAM 200 may store programs, data, or instructions temporarily. For example, the programs and/or data stored in the memory 400 may be temporarily stored in the RAM 200 under the control of the processor 300 or depending on a booting code. The RAM 200 may be implemented by using dynamic random access memory (DRAM) or static random access memory (SRAM).

The processor 300 may control an overall operation of the neural network device 10. For example, the processor 300 may be a central processing unit (CPU). The processor 300 may include a single processor core or a plurality of processor cores. The processor 300 may process or execute the programs and/or data stored in the RAM 200 and the memory 400. For example, the processor 300 may control functions of the neural network device 10 by executing the programs stored in the memory 400.

The memory 400 is a storage for storing data, and may store, for example, an operating system (OS), various kinds of programs, and various kinds of data. The memory 400 may be, but is not limited to, DRAM. The memory 400 may include at least one of volatile memory and non-volatile memory. The non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), etc. The volatile memory may include DRAM, SRAM, synchronous DRAM (SDRAM), PRAM, MRAM, RRAM, ferroelectric RAM (FeRAM), etc. According to an embodiment, the memory 400 may include at least one of a hard disk drive (HDD), a solid state drive (SSD), a compact flash (CF), a secure digital (SD) card, a micro-secure digital (Micro-SD) card, a mini-secure digital (Mini-SD) card, an extreme digital (xD) card, and a memory Stick.

The sensor module 500 may collect information about the vicinity of the neural network device 10. The sensor module 500 may sense or receive an image signal from outside the neural network device 10, and convert the sensed or received image signal to image data, that is, an image frame. To this end, the sensor module 500 may include a sensing apparatus, that is, at least one of various kinds of sensing apparatuses such as a photographing apparatus, an image sensor, a light detection and ranging (LIDAR) sensor, an ultrasonic sensor, and an infrared sensor, or may receive a sensing signal from the sensing apparatus. According to an embodiment, the sensor module 500 may provide an image frame to the neural network IC 100. For example, the sensor module 500 may include an image sensor, and may photograph an external environment of the neural network device 10 to generate a video stream, and may sequentially provide successive image frames of the video stream to the neural network IC 100.

In the neural network device 10 according to an embodiment of the inventive concepts, the neural network IC 100 may store input feature map data in a buffer in units of cells, based on the input data provided by the one or more IPs. Each cell may include at least one feature. The neural network IC 100 may generate input extracted data by extracting feature data of one of features that each correspond to an identical coordinate value and are included in a plurality of cells included in the input feature map data. In other words, the neural network IC 100 may generate a value corresponding to a first coordinate value of the input extracted data by extracting feature data of one of features that are respectively included in the plurality of cells and correspond to the first coordinate value. According to an embodiment, the neural network IC 100 may generate first data based on the extracted feature data, and may generate the input extracted data by rotating the first data in a vertical direction and/or a horizontal direction. The neural network IC 100 may perform convolution by multiplying the input extracted data by weight values. As described above, the neural network IC 100 may extract data necessary for a computation by using small-sized multiplexers by extracting feature data of one of features that each correspond to an identical coordinate value and are respectively included in the plurality of cells. Accordingly, a data extraction speed of the neural network IC 100 may increase, and power consumption for data extraction may be reduced. Furthermore, an operating speed of the neural network device 10 may increase, or the neural network device 10 may consume less power. In detail, because the neural network IC 100 may be implemented with a small number of multiplexers compared with the conventional art, the neural network IC 100 may reduce the area occupied by multiplexers when being implemented as a chip, and accordingly is beneficial in terms of design.

Figure 3:
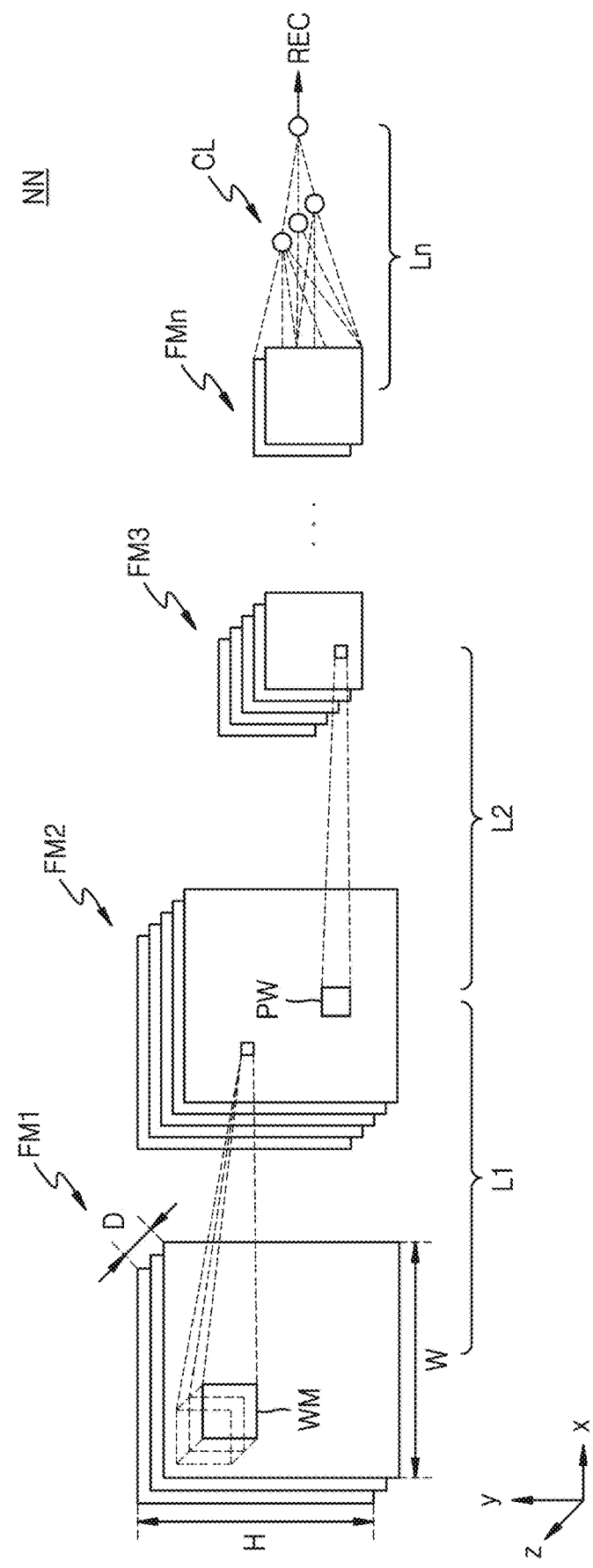
FIG. 3 illustrates a structure of a convolutional neural network as an example of a neural network structure.

FIG. 3 illustrates a structure of a convolution neural network as an example of a neural network structure. A neural network NN may include a plurality of layers L1 to Ln. Each of the plurality of layers L1 to Ln may be a linear layer or a non-linear layer. According to an embodiment, at least one linear layer is coupled to at least one non-linear layer and a result of the coupling may be denoted by one layer. For example, a linear layer may include a convolution layer, a fully connected layer, and a non-linear layer may include a pooling layer and an activation layer.

For example, a first layer L1 may be a convolution layer, a second layer L2 may be a pooling layer, and an n-th layer may be a fully connected layer as an output layer. The neural network NN may further include an activation layer and may further include a layer configured to perform other kind of operation.

Each of the plurality of layers L1 to Ln may receive, as an input feature map, a feature map generated from input data (e.g., an image frame) or a previous layer, and perform an operation on the input feature map to generate an output feature map or a recognition signal REC. In an embodiment, the feature map denotes data in which various features of input data have been expressed. First, second, third, through to n-th feature maps FM1, FM2, FM3, through to FMn may each have, for example, a two-dimensional (2D) matrix or three-dimensional (3D) matrix (or referred to as a tensor) form. Each of the first, second, third, through to n-th feature maps FM1, FM2, FM3, through to FMn may have a width W (or referred to as a column), a height H (or referred to as a row), and a depth D. These may correspond to an x-axis, a y-axis, and a z-axis on a coordinate system, respectively. In an embodiment, the depth D may be denoted by the number of channels.

The first layer L1 may perform convolution on the first feature map FM1 and a weight map WM to generate the second feature map FM2. The weight map WM may filter the first feature map FM1 and may be denoted by a filter or a kernel. A depth of the weight map WM, that is, the number of channels of the weight map WM, is the same as a depth of the first feature map FM1, that is, the number of channels, and convolution may be performed on the same channels of the weight map WM and the first feature map FM1. The weight map WM may be shifted in a crossing manner by using the first input feature map FM1 as a sliding window. A shifting amount may be denoted by a "stride length" or a "stride". During each shift, weights included in the weight map WM may be multiplied by and added to all pieces of feature data of a portion of the first feature map FM1 overlapped by the weight map WM. The pieces of feature data of the portion of the first feature map FM1 overlapped by the weight values included in the weight map WM may be referred to as extracted data. As convolution is performed on the first feature map FM1 and the weight map WM, one channel of the second feature map FM2 may be generated. Though FIG. 3 illustrates one weight map WM, convolution may be actually performed on a plurality of weight maps and the first feature map FM1, and thus a plurality of channels of the second feature map FM2 may be generated. In other words, the number of channels of the second feature map FM2 may correspond to the number of weight maps WM.

The second layer L2 may generate the third feature map FM3 by changing a spatial size of the second feature map FM2 through pooling. The pooling may be denoted by sampling or down-sampling. A 2D pooling window PW may be shifted on the second feature map FM2 in units of a size of the pooling window PW, and a maximum value (or, alternatively, an average value of pieces of feature data) among pieces of feature data of a portion of the second feature map FM2 overlapped by the pooling window PW may be selected. Accordingly, the third feature map FM3 in which a spatial size has changed may be generated from the second feature map FM2. The number of channels of the third feature map FM3 is the same as the number of channels of the second feature map FM2.

The n-th layer Ln may combine features of the n-th feature map FMn to classify a class CL of the input data. The n-th layer may generate a recognition signal REC corresponding to the class. According to an embodiment, the input data may correspond to frame data included in a video stream, and the n-th layer Ln may recognize an object and generate a recognition signal REC corresponding to the recognized object, by extracting a class corresponding to the object included in an image represented by the frame data based on the n-th feature map FMn provided from a previous frame.

Figure 4A:
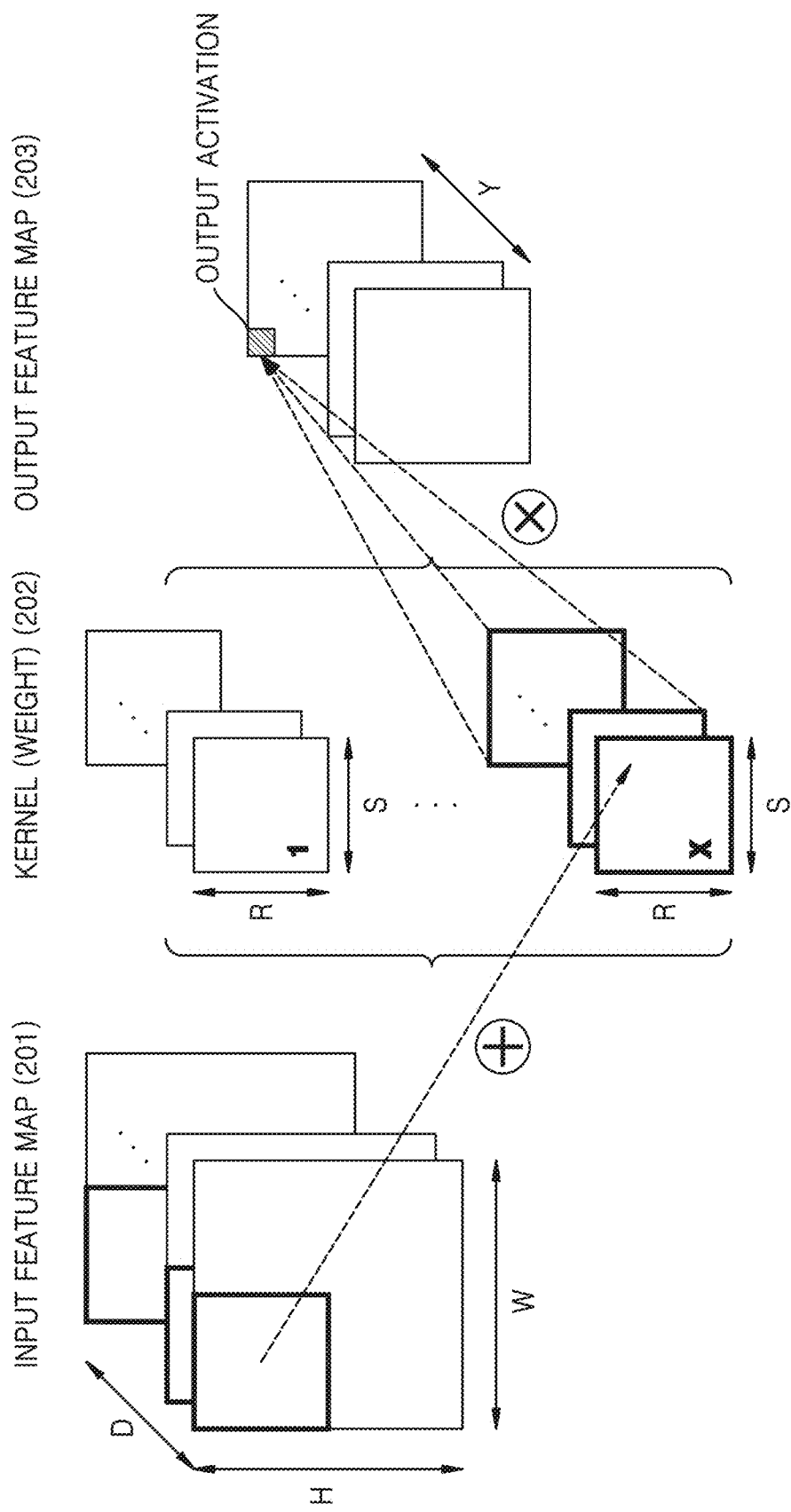
FIGS. 4A and 4B are schematic diagrams for explaining a convolution operation of a neural network.
Figure 4B:
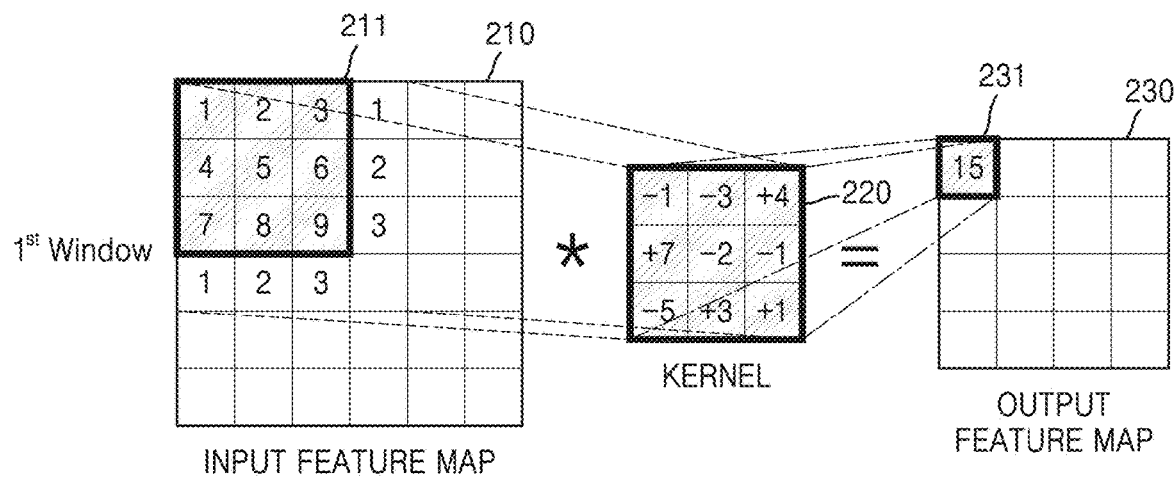
Figure 4B:
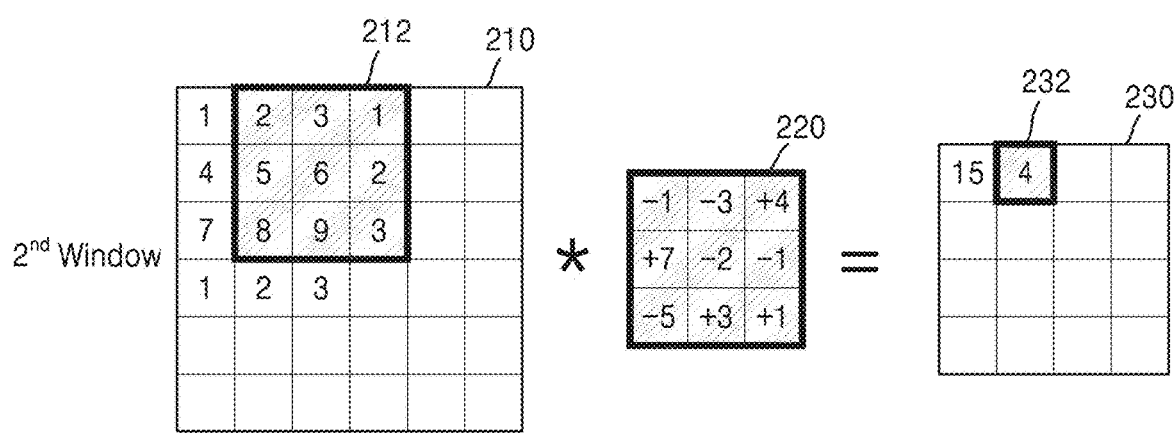
Figure 4B:
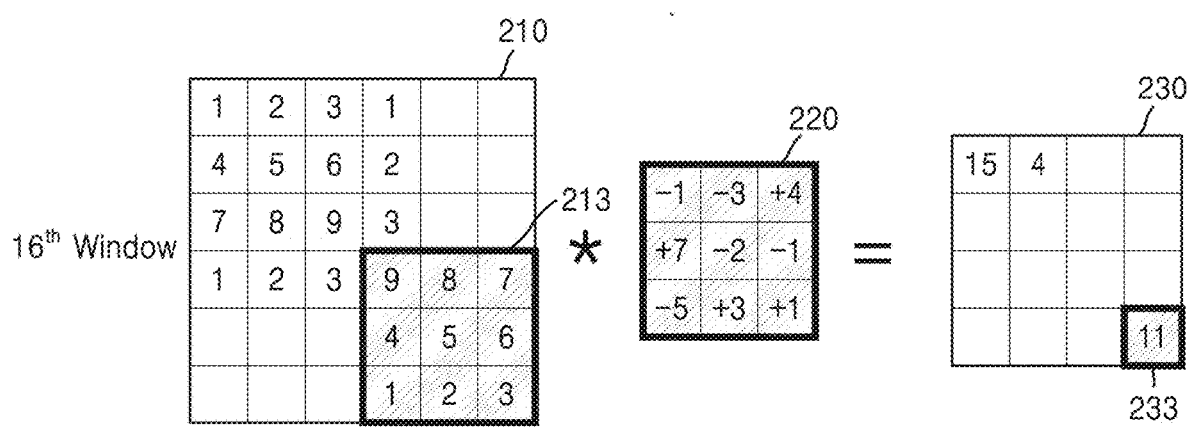

FIGS. 4A and 4B are schematic diagrams for explaining a convolution operation of a neural network.

Referring to FIG. 4A, input feature maps 201 may include D channels, and an input feature map of each channel may have a column size of H and a row size of W (where D, H, and W are natural numbers). Each of kernels 202 may have a column size of R and a row size of S, and the kernels 202 may include channels, the number of which corresponds to the number D of channels (or a depth) of the input feature maps 201, wherein R and S are natural numbers. Output feature maps 203 may be generated via a 3D convolution operation between the input feature maps 201 and the kernels 202, and may include Y channels according to the 3D convolution operation.

A process of generating an output feature map via a 2D convolution operation between one input feature map and one kernel may be described with reference to FIG. 4B, and the 2D convolution operation of FIG. 4B may be performed on the input feature maps 201 of the entire channels and the kernels 202 of the entire channels and thus the output feature maps 203 of the entire channels may be generated.

Referring to FIG. 4B, for convenience of explanation, it is assumed that an input feature map 210 has a 6×6 size, an original kernel 220 has a 3×3 size, and an output feature map 230 has a 4×4 size, but embodiments are not limited thereto. The neural network may be implemented with various sizes of feature maps and various sizes of kernels. Values defined in the input feature map 210, the original kernel 220, and the output feature map 230 are all example values, and embodiments of the inventive concepts are not limited thereto.

The original kernel 220 may perform a convolution operation while sliding on the input feature map 210 in units of a window of a 3×3 size. The convolution operation may represent an operation of calculating each feature data of the output feature map 230 by first multiplying pieces of feature data of a window of the input feature map 210 by weight values at locations on the original kernel 220 corresponding to the pieces of feature data, respectively, and then adding up the products of the multiplications. The pieces of feature data included in the window of the input feature map 210 that are multiplied by the weight values may be referred to as extracted data extracted from the input feature map 210. In detail, the original kernel 220 may first undergo convolution together with first extracted data 211 of the input feature map 210. In other words, pieces of feature data of 1, 2, 3, 4, 5, 6, 7, 8, and 9 of the first extracted data 211 may be multiplied by weight values of −1, −3, 4, 7, −2, −1, −5, 3, and 1 of the original kernel 220, respectively, and, as a result, −1, −6, 12, 28, −10, −6, −35, 24, and 9 may be obtained. Next, the obtained values of −1, −6, 12, 28, −10, −6, −35, 24, and 9 may be added up to make 15, and feature data 231 on a first row and a first column of the output feature map 230 may be determined to be 15. The feature data 231 on the first row and the first column of the output feature map 230 corresponds to the first extracted data 211. Similarly, convolution may be performed on second extracted data 212 of the input feature map 210 and the original kernel 220, and thus feature data 232 on the first row and a second column of the output feature map 230 may be determined to be 4. Finally, convolution may be performed on sixteenth extracted data 213, which is last extracted data of the input feature map 210, and the original kernel 220, and thus feature data 233 on a fourth row and a fourth column of the output feature map 230 may be determined to be 11.

In other words, convolution on the single input feature map 210 and the single original kernel 220 may be achieved by repeating a multiplication between extracted data of the input feature map 210 and weight values of the original kernel 220 and an addition of results of the multiplications, and the output feature map 230 may be generated as a result of the convolution.

Referring to FIGS. 1, 4A, and 4B, the neural network IC 100 may generate an input feature map based on the input data received from the one or more IPs, and may extract, from the input feature map, data that is directly multiplied by the weight values. To this end, the neural network IC 100 may include at least one multiplexer (MUX), and may extract data that is directly multiplied by the weight values, from among pieces of input feature map data included in the input feature map, by using the at least one multiplexer. The data that is directly multiplied by the weight values may be referred to as extracted data. For convenience of explanation, each of the values of a plurality of features included in a feature map will now be referred to as feature data, and a plurality of pieces of feature data included in the feature map will now be referred to as feature map data. Feature data of a feature is considered to mean a feature value of the feature. An apparatus and method of extracting, from a feature map or feature map data, extracted data that is directly used in a computation, according to an embodiment of the inventive concepts, will now be described with reference to the drawings below.

Figure 5:
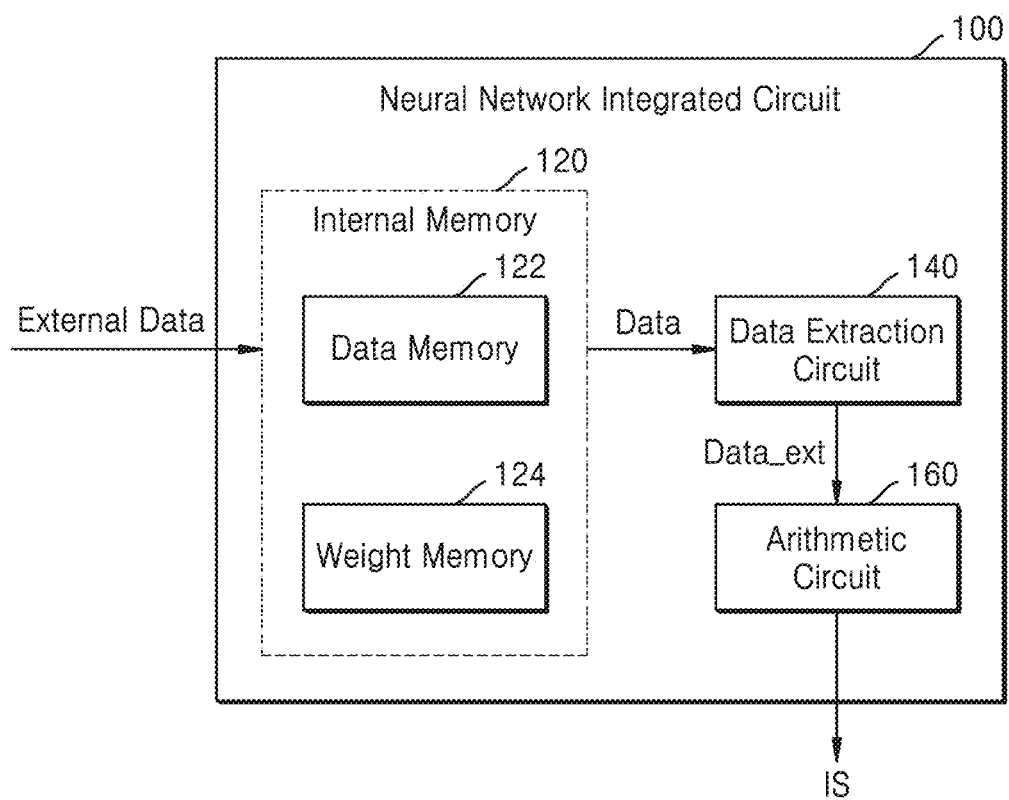
FIG. 5 is a block diagram of a neural network integrated circuit (IC) according to an embodiment of the inventive concepts.

FIG. 5 is a block diagram of a neural network IC 100 according to an embodiment of the inventive concepts. The neural network IC 100 may include an internal memory 120, a data extraction circuit 140, and/or an arithmetic circuit 160. Descriptions of the neural network IC 100 of FIG. 5 that are the same as those made with reference to FIGS. 1 and 2 are not repeated herein.

The internal memory 120 may receive external data from outside the neural network IC 100. The external data may also be referred to as input data. The internal memory 120 may store the external data, various kinds of data necessary for a computation, and weight values. To this end, the internal memory 120 may include a data memory 122 storing the various kinds of data, and/or a weight memory 124 storing the weight values. The data memory 122 and the weight memory 124 may be configured as independent hardware, but embodiments are not limited thereto. For example, the data memory 122 and the weight memory 124 may represent memories corresponding to different areas within single hardware. Each of the data memory 122 and the weight memory 124 may be implemented using various types of memory, such as DRAM, SRAM, and SDRAM.

The data extraction circuit 140 may generate extracted data Data_ext based on data Data stored in the data memory 122. The data Data may indicate feature map data, and the extracted data Data_ext may indicate data necessary for a computation from among pieces of data included in the feature map data. The data extraction circuit 140 may store the data Data as the feature map data in units of cells. For example, the data extraction circuit 140 may include a buffer that stores the data Data as the feature map data in units of cells. Each cell may include at least one feature. For example, a cell may have a size of four features x four features. The data extraction circuit 140 may generate the extracted data Data_ext by extracting feature data of one of features that each correspond to an identical coordinate value and are respectively included within a plurality of cells in the feature map data. In other words, the data extraction circuit 140 may extract feature data of one of features that are respectively included in the plurality of cells and correspond to a first coordinate value, and may generate first data by extracting pieces of feature data corresponding to all coordinate values. According to an embodiment, the data extraction circuit 140 may generate the extracted data Data_ext by rotating the first data in a vertical direction and/or a horizontal direction. For example, the data extraction circuit 140 may rotate the first data in a vertical direction by changing at least a portion of an order of the rows of the first data, and may rotate the first data in a horizontal direction by changing at least a portion of an order of the columns of the first data. The amounts of rotation of the first data in a vertical direction and/or a horizontal direction may be determined based on a location of the extracted data Data_ext on the feature map data. In other words, according to a location of the extracted data Data_ext on the feature map data, the data extraction circuit 140 may not change the respective orders of the rows and the columns of the first data. The data extraction circuit 140 may provide the extracted data Data_ext to the arithmetic circuit 160.

The arithmetic circuit 160 may receive the extracted data Data_ext from the data extraction circuit 140, and may perform a computation based on the extracted data Data_ext. The computation may include at least one of various kinds of computations, such as multiplication, addition, and an XOR operation. According to an embodiment, the arithmetic circuit 160 may perform a convolution operation of the neural network IC 100 by multiplying the weight values stored in the weight memory 124 by the extracted data Data_ext corresponding to the weight values and then adding up results of the multiplications. The arithmetic circuit 160 may output an information signal IS to outside of the neural network IC 100 via at least one computation.

Figure 6:
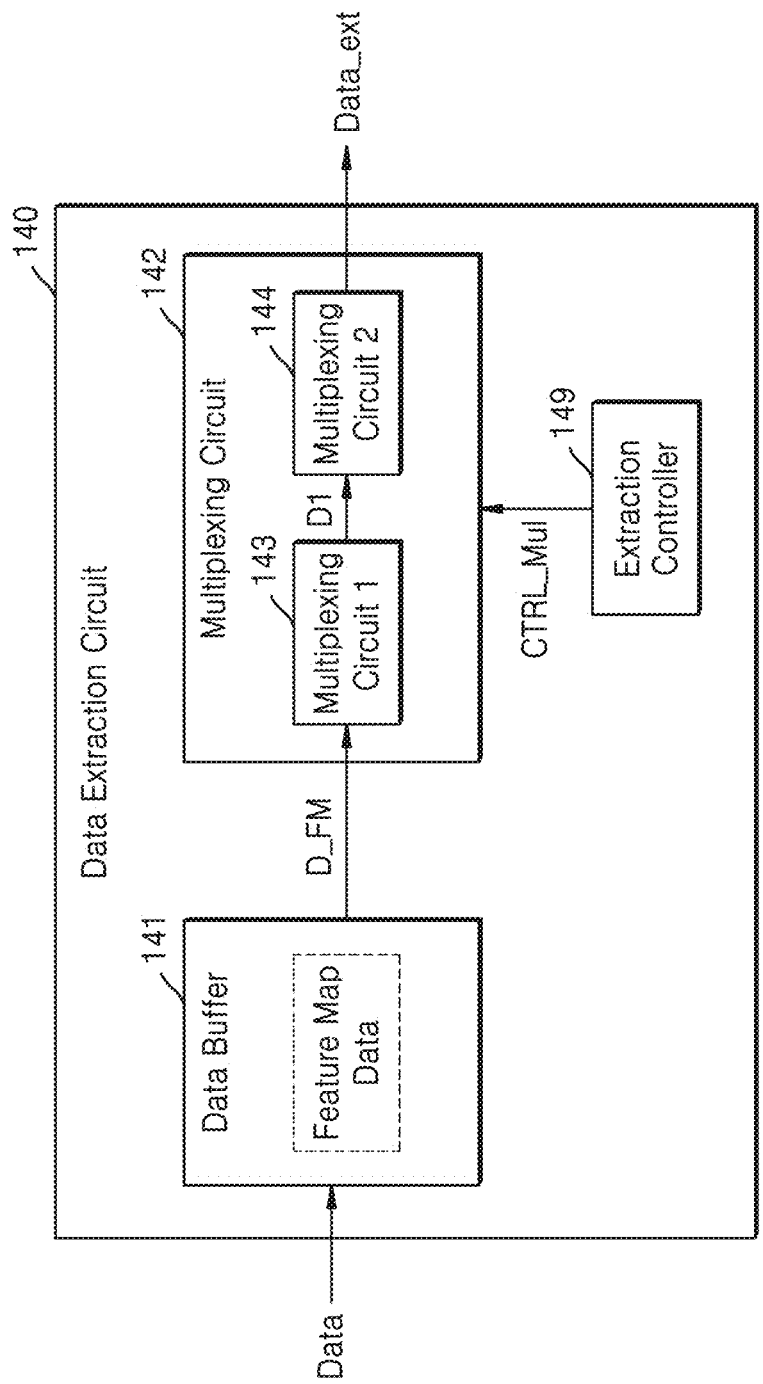
FIG. 6 illustrates a block diagram of the data extraction circuit according to an embodiment of the inventive concepts.

FIG. 6 is a block diagram of the data extraction circuit 140 according to an embodiment of the inventive concepts. The data extraction circuit 140 may include a data buffer 141, a multiplexing circuit 142, and/or an extraction controller 149. Descriptions of the data extraction circuit 140 of FIG. 6 that are the same as those made with reference to FIG. 5 are not repeated herein.

The data buffer 141 may store feature map data D_FM, based on the data Data received from outside the data extraction circuit 140. According to an embodiment, the data buffer 141 may store the feature map data D_FM in units of cells each including at least one feature. In other words, the data buffer 141 may classify the feature map data D_FM according to a plurality of cells and store the feature map data D_FM as the plurality of cells. According to an embodiment, the data extraction circuit 140 may further include a processor (not shown) and a memory (not shown), and the processor executes instructions stored in the memory such that the data extraction circuit 140 may perform a certain operation. For example, the data extraction circuit 140 may store address information of each of the plurality of cells included in the feature map data D_FM in the memory, and obtain pieces of feature data included in the plurality of cells by accessing the plurality of cells based on the address information stored in the memory.

The multiplexing circuit 142 may output the extracted data Data_ext by extracting pieces of data necessary for a computation from the feature map data D_FM stored in the data buffer 141. To this end, the multiplexing circuit 142 may include at least one MUX. According to an embodiment, the multiplexing circuit 142 may include a first multiplexing circuit 143 and/or a second multiplexing circuit 144.

The first multiplexing circuit 143 may extract feature data of one of features that are included in the plurality of cells included in the feature map data D_FM, the features each corresponding to an identical coordinate value, and may generate first data D1 by extracting pieces of feature data corresponding to all coordinate values. The operation, performed by the first multiplexing circuit 143, of generating the first data D1 may be referred to as data extraction, and the data extraction may be described later with reference to FIGS. 7A through 7C. According to an embodiment, the first multiplexing circuit 143 may include a plurality of multiplexers each of which selects one from among input signals, the number of which corresponds to the number of cells included in the feature map data D_FM. For example, when the feature map data D_FM includes N (where N is a natural number) cells, the first multiplexing circuit 143 may include a plurality of N:1 multiplexers. According to an embodiment, the first multiplexing circuit 143 may include "M" multiplexers, the number of which corresponds to the number of features included in each cell. For example, when each cell includes M (where M is a natural number) features, the first multiplexing circuit 143 may include M multiplexers. In other words, when the feature map data D_FM includes N cells and each cell includes M features, the first multiplexing circuit 143 may include M N:1 multiplexers.

According to an embodiment, the first multiplexing circuit 143 may classify the features included in the feature map data D_FM into a plurality of groups. In an embodiment, each of the plurality of groups may include features that are included in the plurality of cells included in the feature map data D_FM, the features each corresponding to an identical coordinate value. The first multiplexing circuit 143 may extract feature data of one feature from each of the plurality of groups, and may generate the first data D1 based on the extracted pieces of feature data. According to an embodiment, the first data D1 may be data in a matrix form.

The second multiplexing circuit 144 may generate the extracted data Data_ext based on the first data D1 provided by the first multiplexing circuit 143. For example, the second multiplexing circuit 144 may generate the extracted data Data_ext by rotating the first data D1 in a vertical direction and/or a horizontal direction. For example, the second multiplexing circuit 144 may rotate the first data D1 in a vertical direction by changing an order of the rows of the first data D1, and may rotate the first data D1 in a horizontal direction by changing an order of the columns of the first data D1. According to an embodiment, the second multiplexing circuit 144 may generate the extracted data Data_ext by rotating the first data D1 in a vertical direction and then rotating vertically-rotated first data in a horizontal direction. However, embodiments are not limited thereto. According to an embodiment, the second multiplexing circuit 144 may generate the extracted data Data_ext by rotating the first data D1 in a horizontal direction and then rotating horizontally-rotated first data in a vertical direction. According to an embodiment, the second multiplexing circuit 144 may be implemented using single hardware that rotates the first data in a vertical direction and a horizontal direction. The operation of generating the extracted data Data_ext based on the first data D1 may be referred to as a data rotating operation, and the data rotating operation may be described later in more detail with reference to FIGS. 8A through 10. According to an embodiment, the second multiplexing circuit 144 may include multiplexers, the number of which corresponds to a value obtained by adding the number of rows of the first data D1 to the number of columns of the first data D1. For example, when the first data D1 represents a K×L (where K and L are natural numbers) matrix form, the second multiplexing circuit 144 may include (K+L) multiplexers. In detail, the second multiplexing circuit 144 may include K multiplexers for vertical rotation, and L multiplexers for horizontal rotation.

The extraction controller 149 may generate at least one multiplexer control signal CTRL_Mul for controlling the at least one multiplexer included in the multiplexing circuit 142, and may provide the at least one multiplexer control signal CTRL_Mul to the multiplexing circuit 142. The at least one multiplexer included in the multiplexing circuit 142 may select one from among a plurality of input signals, based on the at least one multiplexer control signal CTRL_Mul. The extraction controller 149 may be implemented using special hardware, such as an analog circuit, or an operation of the extraction controller 149 may be performed by the processor included in the data extraction circuit 140.

Figure 7A:
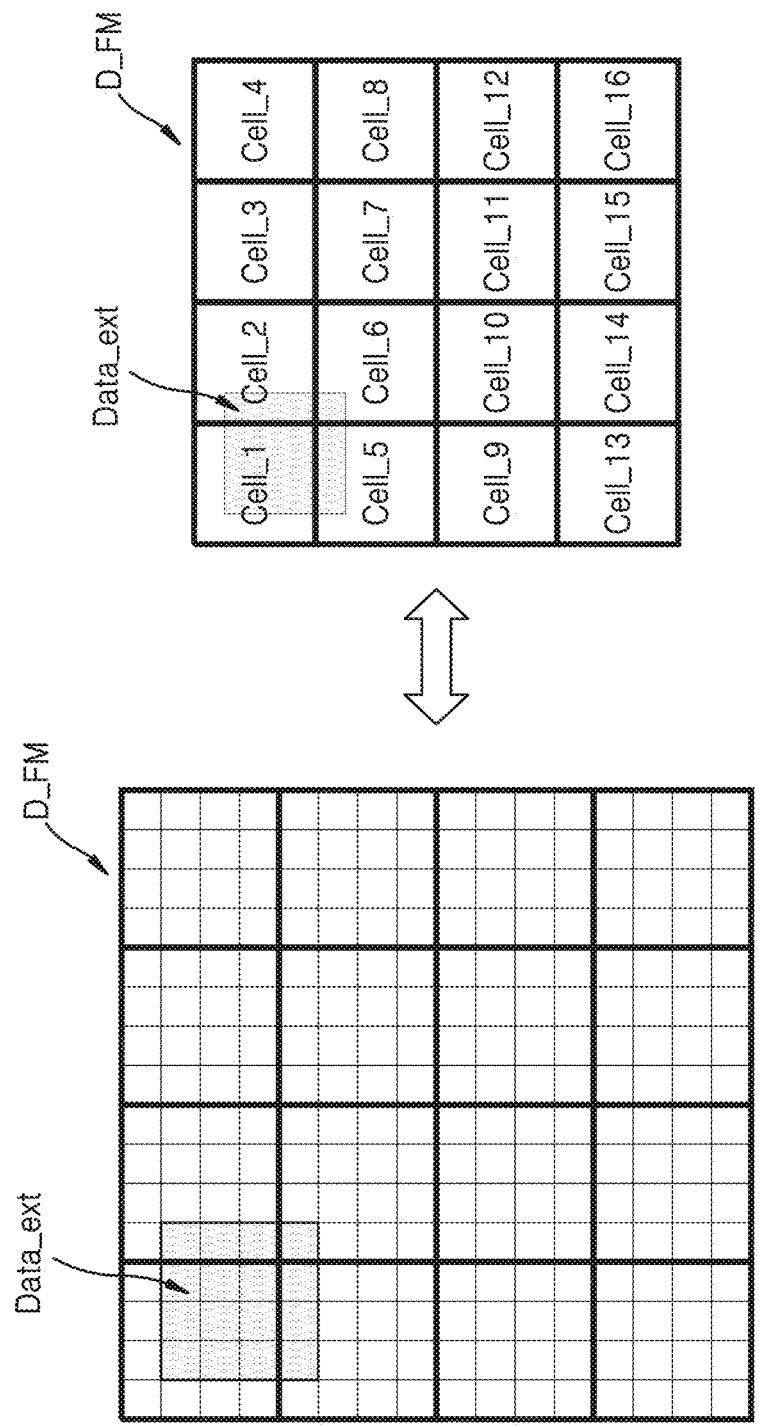
FIG. 7A illustrates feature map data and extracted data so as to explain a data extraction process according to an embodiment of the inventive concepts.

FIG. 7A illustrates the feature map data D_FM and the extracted data Data_ext so as to explain a data extraction process according to an embodiment of the inventive concepts. For convenience of explanation, FIG. 7A illustrates an embodiment in which the feature map data D_FM includes 16 cells each including 16 features, but the number of cells and the number of features are merely examples. Thus, embodiments of the inventive concepts are not limited thereto. FIG. 7A will now be described with reference to FIGS. 5 and 6.

When the neural network IC 100 performs a neural network operation (for example, convolution) based on a data feature map, the arithmetic circuit 160 may need the extracted data Data_ext from among the feature map data D_FM. In an embodiment, the data extraction circuit 140 may extract the extracted data Data_ext from the feature map data D_FM. According to an embodiment, a size of the extracted data Data_ext may be less than or equal to a size of each cell.

The feature map data D_FM may include first through sixteenth cells Cell_1 through Cell_16. The feature map data D_FM may be stored as the first through sixteenth cells Cell_1 through Cell_16 in the data buffer 141. A portion of the extracted data Data_ext necessary for the neural network operation is included in the first cell Cell_1, another portion thereof is included in the second cell Cell_2, another portion thereof is included in the fifth cell Cell_5, and another portion thereof is included in the sixth cell Cell_6. A process of extracting the extracted data Data_ext of FIG. 7A from the feature map data D_FM of FIG. 7A will now be described with reference to FIGS. 7B and 7C.

Figure 7B:
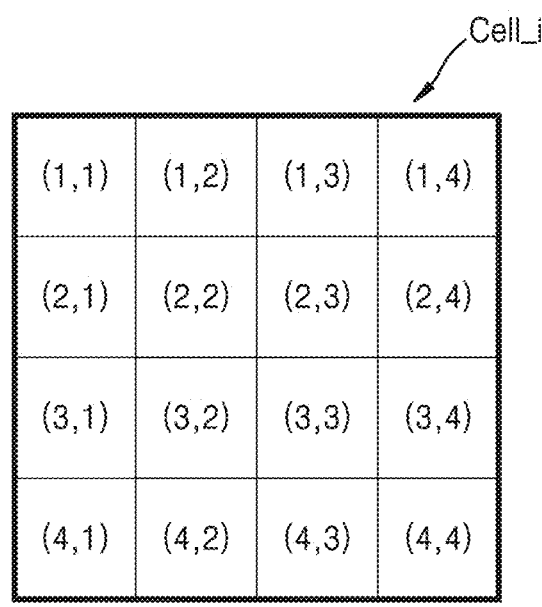
FIG. 7B illustrates coordinate values of a cell so as to explain a data extraction process according to an embodiment of the inventive concepts.

FIG. 7B illustrates coordinate values of a cell Cell_i in order to explain a data extracting process according to an embodiment of the inventive concepts. The cell Cell_i is a representative example of the first through sixteenth cells Cell_1 through Cell_16 of FIG. 7A. For convenience of explanation, FIG. 7B illustrates an embodiment in which the cell Cell_i includes 16 features. However, embodiments are not limited thereto.

The cell Cell_i may be matrix-shaped data including a plurality of rows and a plurality of columns. The cell Cell_i may include a plurality of features corresponding to coordinate values each of which is determined based on a row and a column. In an embodiment, for convenience of explanation, a coordinate value of a feature located on an i-th row and a j-th column within the cell Cell_i is expressed as (i,j) (where i and j are natural numbers that are less than or equal to 4). Because the cell Cell_i includes 16 features, the cell Cell_i may include features corresponding to a total of 16 coordinate values that are different from each other.

Figure 7C:
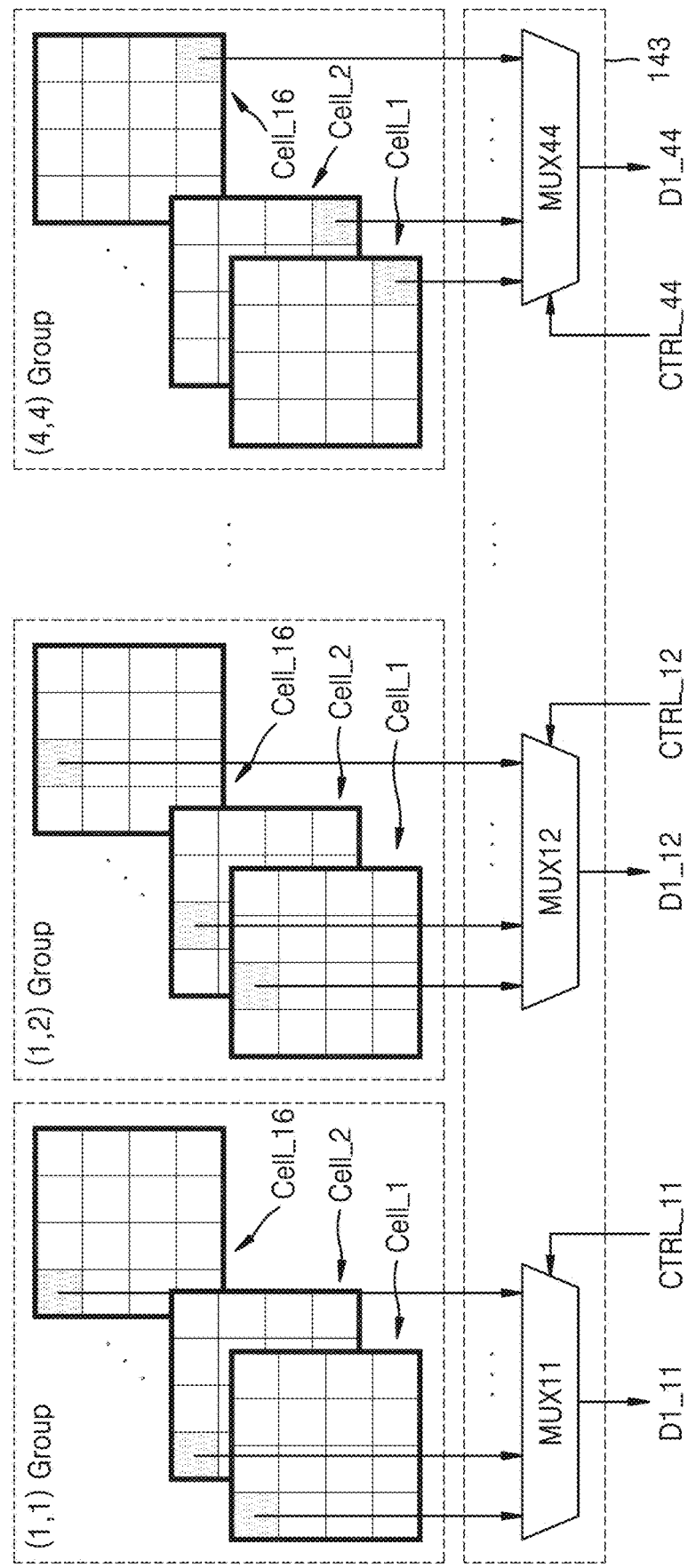
FIG. 7C illustrates cells and a first multiplexing circuit so as to explain a data extraction process according to an embodiment of the inventive concepts.

FIG. 7C illustrates cells and the first multiplexing circuit 143 in order to explain a data extracting process according to an embodiment of the inventive concepts. For example, FIG. 7C illustrates the first multiplexing circuit 143 that extracts the extracted data Data_ext from the feature map data D_FM according to an embodiment such as FIG. 7A. FIG. 7C will now be described with reference to FIG. 7A.

The features included in the feature map data D_FM may be classified into a plurality of groups. For example, a (1,1) group may include features corresponding to a (1,1) coordinate value and respectively included in the first through sixteenth cells Cell_1 through Cell_16. For example, a (1,2) group may include features corresponding to a (1,2) coordinate value and respectively included in the first through sixteenth cells Cell_1 through Cell_16. For example, a (4,4) group may include features corresponding to a (4,4) coordinate value and respectively included in the first through sixteenth cells Cell_1 through Cell_16.

The first multiplexing circuit 143 may generate first data by extracting one piece of data from each of the plurality of groups. To this end, the first multiplexing circuit 143 may include a plurality of multiplexers corresponding to the plurality of groups. According to an embodiment, each of the plurality of multiplexers may be a multiplexer that selects one from among input signals, the number of which corresponds to the number of cells included in the feature map data D_FM. According to an embodiment, the first multiplexing circuit 143 may include multiplexers, the number of which corresponds to the number of features included in each cell. For example, in the embodiment of FIG. 7A, the first multiplexing circuit 143 may include sixteen 16:1 multiplexers. According to an embodiment, each of the plurality of multiplexers may extract data from one of the plurality of cells, based on a location of the extracted data Data_ext on the feature map data D_FM.

A multiplexer MUX11 may output first data D1_11 corresponding to the (1,1) coordinate value by extracting feature data of one of the features corresponding to the (1,1) coordinate value, based on a control signal CTRL_11. In particular, in the embodiment of FIG. 7A, the multiplexer MUX11 may output the first data D1_11 corresponding to the (1,1) coordinate value by extracting feature data of a feature included in the sixth cell Cell_6 from among the features corresponding to the (1,1) coordinate value. The control signal CTRL_11 may be determined based on the location of the extracted data Data_ext on the feature map data D_FM. Similarly, a multiplexer MUX12 may output first data D1_12 corresponding to the (1,2) coordinate value by extracting feature data of one of the features corresponding to the (1,2) coordinate value, based on a control signal CTRL_12. In particular, in the embodiment of FIG. 7A, the multiplexer MUX12 may output the first data D1_12 corresponding to the (1,2) coordinate value by extracting feature data of a feature included in the fifth cell Cell_5 from among the features corresponding to the (1,2) coordinate value. The control signal CTRL_12 may be determined based on the location of the extracted data Data_ext on the feature map data D_FM. Control signals CTRL_11, CTRL_12, through to CTRL_44 may be provided by the extraction controller 149 of FIG. 6. For example, the control signals CTRL_11, CTRL_12, through to CTRL_44 may be included in the multiplexer control signal CTRL_Mul of FIG. 6.

The first multiplexing circuit 143 may output the first data based on the pieces of extracted data D1_11, D1_12, through to D1_44.

Figure 8B:
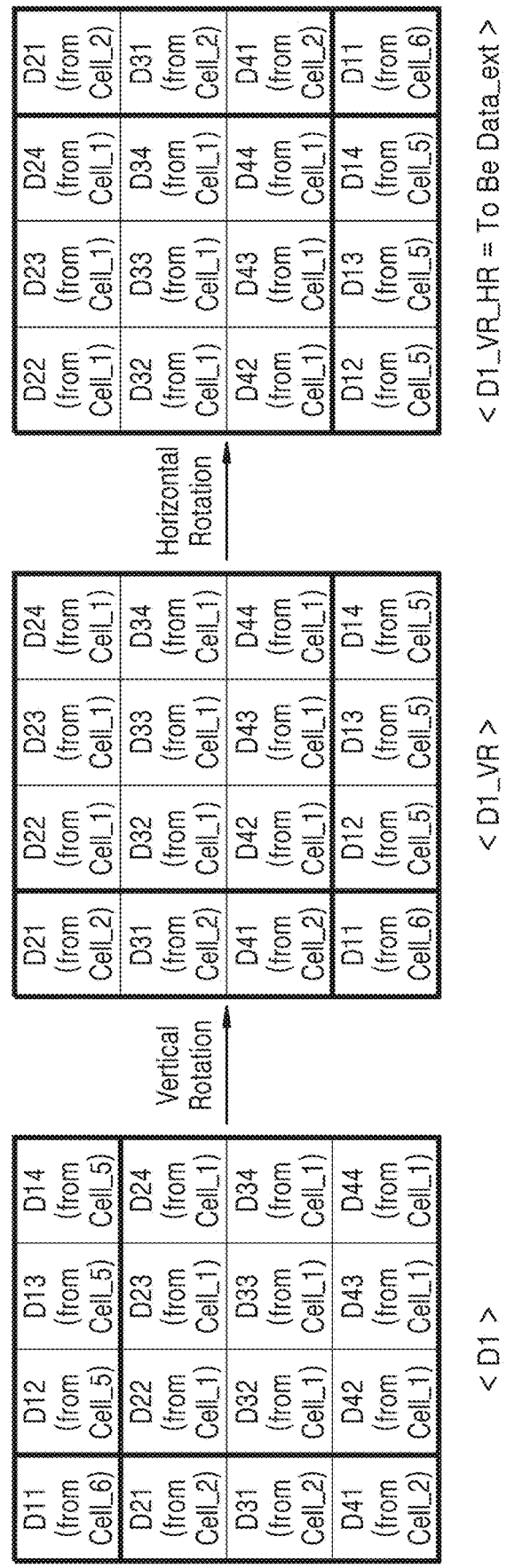

FIGS. 8A and 8B illustrate pieces of data in a matrix form in order to explain rotation of the first data D1. For convenience of explanation, FIGS. 8A and 8B illustrate pieces of data corresponding to the embodiment of FIG. 7A. FIGS. 8A and 8B will now be described with reference to FIG. 6.

Referring to FIG. 8A, the first data D1 generated by the first multiplexing circuit 143 include all of the pieces of feature data included in the extracted data Data_ext necessary for a computation, but respective orders of the rows and the columns of the first data D1 may be different from those of the rows and the columns of the extracted data Data_ext. Accordingly, the second multiplexing circuit 144 may generate the extracted data Data_ext by rearranging the rows and/or columns of the first data D1 in a matrix form. In other words, the second multiplexing circuit 144 may generate the extracted data Data_ext by rotating the first data D1 in a vertical direction and/or a horizontal direction.

Referring to FIG. 8B, the first data D1 may become the extracted data Data_ext via vertical rotation and horizontal rotation. For convenience of explanation, FIG. 8B illustrates a case where horizontal rotation is performed after vertical rotation. However, the order between them is not limited thereto. For example, in contrast with FIG. 8B, vertical rotation may be executed after horizontal rotation. The second multiplexing circuit 144 may generate vertically-rotated first data D1_VR by rotating the first data D1 in a vertical direction. In other words, the second multiplexing circuit 144 may generate the vertically-rotated first data D1_VR by changing the order of the rows of the first data D1. Thereafter, the second multiplexing circuit 144 may generate the extracted data Data_ext by rotating the vertically-rotated first data D1_VR in a horizontal direction. In other words, the second multiplexing circuit 144 may generate the extracted data Data_ext by changing the order of the columns of the vertically-rotated first data D1_VR. To execute vertical rotation and/or horizontal rotation, the second multiplexing circuit 144 may include at least one multiplexer. Embodiments regarding a configuration of the second multiplexing circuit 144 will now be described with reference to FIGS. 9A, 9B, and 10.

Figure 9A:
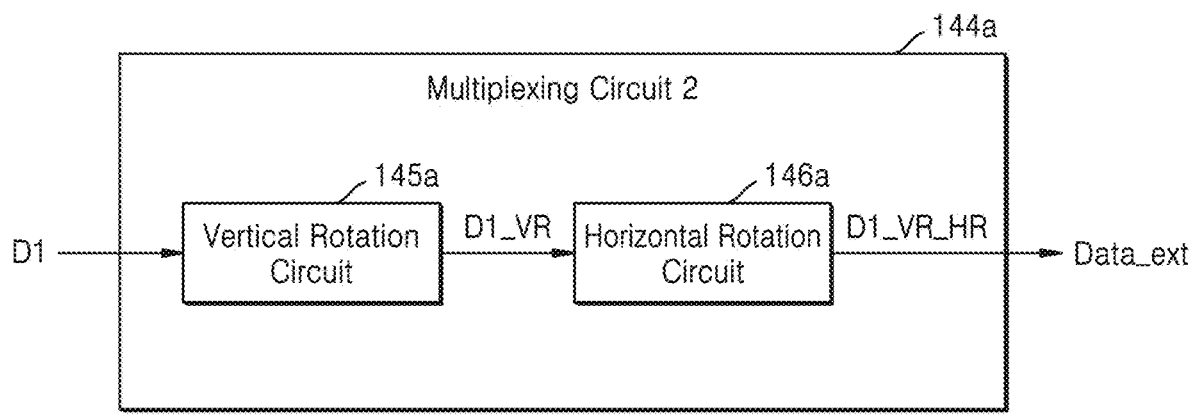
FIGS. 9A and 9B are block diagrams of second multiplexing circuits according to an embodiment of the inventive concepts.
Figure 9B:
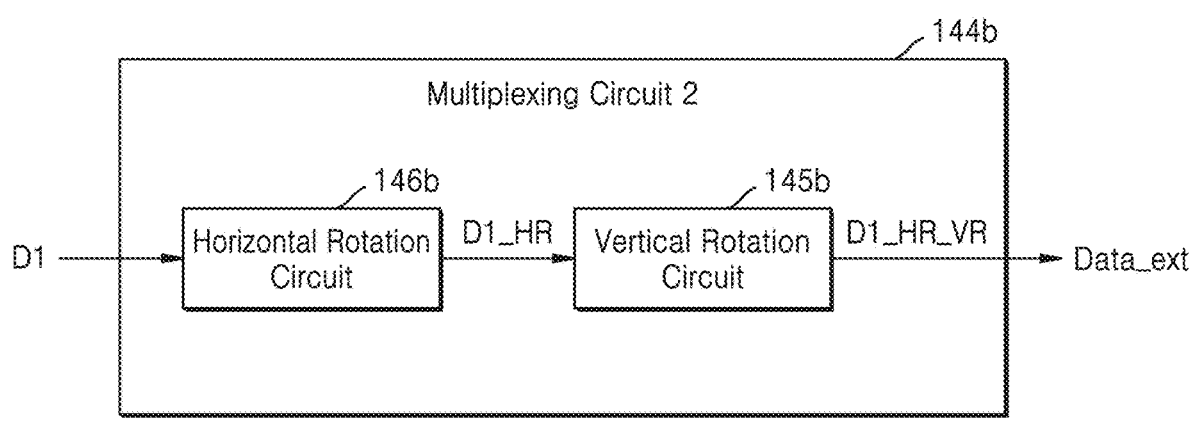

FIGS. 9A and 9B are block diagrams of second multiplexing circuits 144a and 144b according to an embodiment of the inventive concepts.

Referring to FIG. 9A, the second multiplexing circuit 144a may include a vertical rotation circuit 145a and/or a horizontal rotation circuit 146a. The vertical rotation circuit 145a may generate the vertically-rotated first data D1_VR by rotating the first data D1 in a vertical direction, and the horizontal rotation circuit 146a may generate the extracted data Data_ext by rotating the vertically-rotated first data D1_VR in a horizontal direction. To this end, each of the vertical rotation circuit 145a and the horizontal rotation circuit 146a may include at least one multiplexer.

Referring to FIG. 9B, the second multiplexing circuit 144b may include a horizontal rotation circuit 146b and/or a vertical rotation circuit 145b. The horizontal rotation circuit 146b may generate horizontally-rotated first data D1_HR by rotating the first data D1 in a horizontal direction, and the vertical rotation circuit 145b may generate the extracted data Data_ext by rotating the horizontally-rotated first data D1_HR in a vertical direction. To this end, each of the horizontal rotation circuit 146b and the vertical rotation circuit 145b may include at least one multiplexer.

According to an embodiment, the second multiplexing circuit 144 of FIG. 6 may be implemented using the second multiplexing circuit 144a of FIG. 9A or the second multiplexing circuit 144b of FIG. 9B. However, as described above with reference to FIG. 6, the second multiplexing circuit 144 of FIG. 6 is not limited to the embodiment of FIG. 9A or 9B. For example, the second multiplexing circuit 144 of FIG. 6 may be implemented using single hardware that generates the extracted data Data_ext by rotating the first data D1 in a vertical direction and a horizontal direction.

Figure 10:
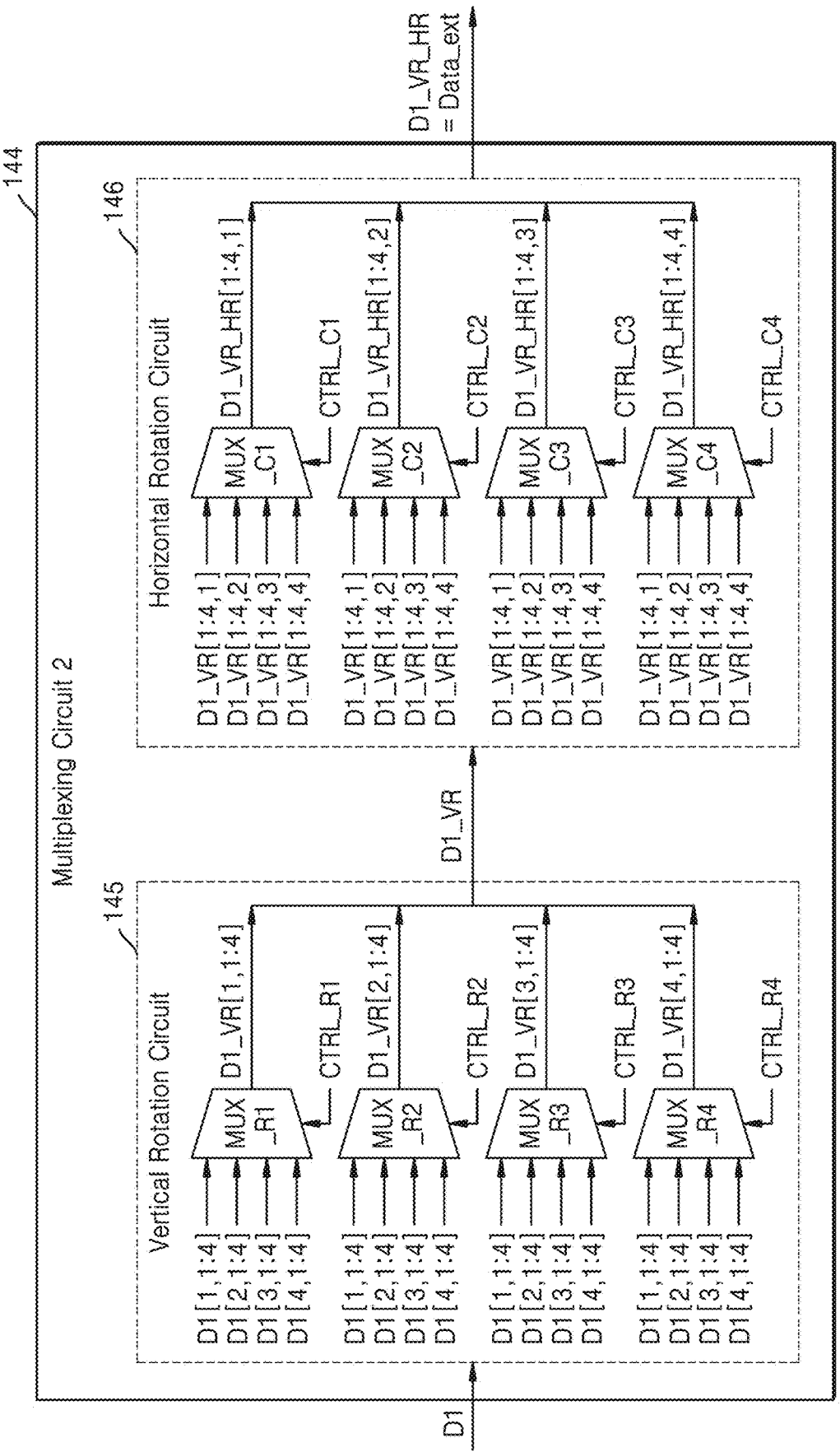
FIG. 10 is a block diagram of a second multiplexing circuit according to an embodiment of the inventive concepts.

FIG. 10 is a block diagram of a second multiplexing circuit 144 according to an embodiment of the inventive concepts. In particular, FIG. 10 illustrates the second multiplexing circuit 144 having the configuration of FIG. 9A. The same rule is applicable to the embodiment of FIG. 9B. FIG. 10 will now be described with reference to FIGS. 7A and 9A.

A vertical rotation circuit 145 may generate the vertically-rotated first data D1_VR by changing the order of the rows of the first data D1. To this end, the vertical rotation circuit 145 may include multiplexers, the number of which corresponds to the number of rows of the first data D1. A multiplexer MUX_R1 may output a first row of the vertically-rotated first data D1_VR by selecting one of the rows of the first data D1, based on a control signal CTRL_R1.

Referring to FIG. 7A, the multiplexer MUX_R1 may output the first row of the vertically-rotated first data D1_VR by selecting pieces of data D1[2, 1:4] corresponding to a second row from among the rows of the first data D1. Similarly, a multiplexer MUX_R4 may output a fourth row of the vertically-rotated first data D1_VR by selecting one of the rows of the first data D1, based on a control signal CTRL_R4. Referring to FIG. 7A, the multiplexer MUX_R4 may output the fourth row of the vertically-rotated first data D1_VR by selecting pieces of data D1[1, 1:4] corresponding to a first row from among the rows of the first data D1. The vertical rotation circuit 145 may provide the vertically-rotated first data D1_VR based on the pieces of data output by the multiplexers MUX_R1 through MUX_R4 to a horizontal rotation circuit 146.

The horizontal rotation circuit 146 may generate the extracted data Data_ext by changing the order of the columns of the vertically-rotated first data D1_VR. To this end, the horizontal rotation circuit 146 may include multiplexers, the number of which corresponds to the number of columns of the first data D1. A multiplexer MUX_C1 may output a first column of the extracted data Data_ext by selecting one of the columns of the vertically-rotated first data D1_VR, based on a control signal CTRL_C1. Referring to FIG. 13, the multiplexer MUX_C1 may output the first column of the extracted data Data_ext by selecting pieces of data D1_VR [1:4, 2] corresponding to a second column from among the columns of the vertically-rotated first data D1_VR. Similarly, a multiplexer MUX_C4 may output a fourth column of the extracted data Data_ext by selecting one of the columns of the vertically-rotated first data D1_VR, based on a control signal CTRL_C4. Referring to FIG. 13, the multiplexer MUX_C4 may output the fourth column of the extracted data Data_ext by selecting pieces of data D1_VR[1:4, 1] corresponding to a first column from among the columns of the vertically-rotated first data D1_VR. The horizontal rotation circuit 146 may output the extracted data Data_ext, based on the pieces of data selected by the multiplexers MUX_C1 through MUX_C4.

Figure 11:
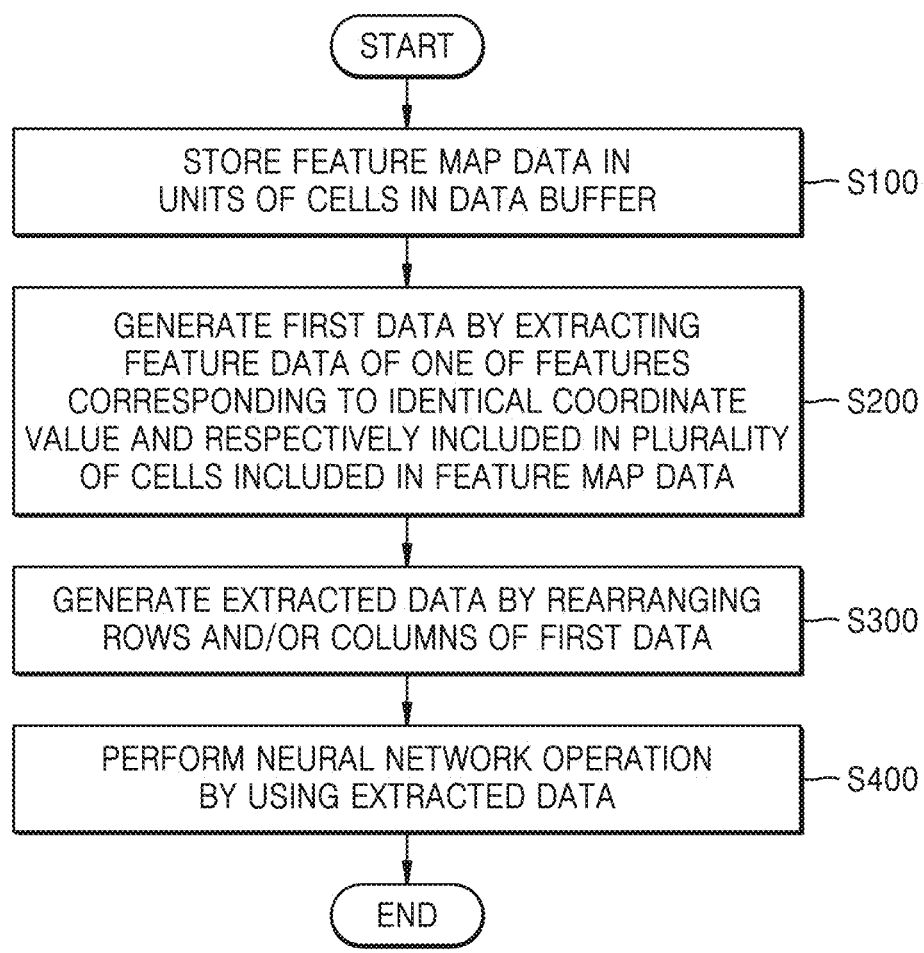
FIG. 11 is a flowchart of a data processing method performed by a neural network device, according to an embodiment of the inventive concepts.

FIG. 11 is a flowchart of a data processing method performed by a neural network device, according to an embodiment of the inventive concepts. FIG. 11 will now be described with reference to FIGS. 5 and 6.

In operation S100, the neural network IC 100 included in the neural network device 10 may store the feature map data D_FM in units of cells in the data buffer 141. Each cell may include at least one feature.

In operation S200, the neural network IC 100 may generate the first data D1 by extracting feature data of one of the features that are included in the plurality of cells included in the feature map data D_FM, the features each corresponding to an identical coordinate value. For example, the first multiplexing circuit 143 included in the multiplexing circuit 142 may extract feature data of one of the features that are included in the plurality of cells and correspond to an identical coordinate value, by using at least one multiplexer.

Figure 12:
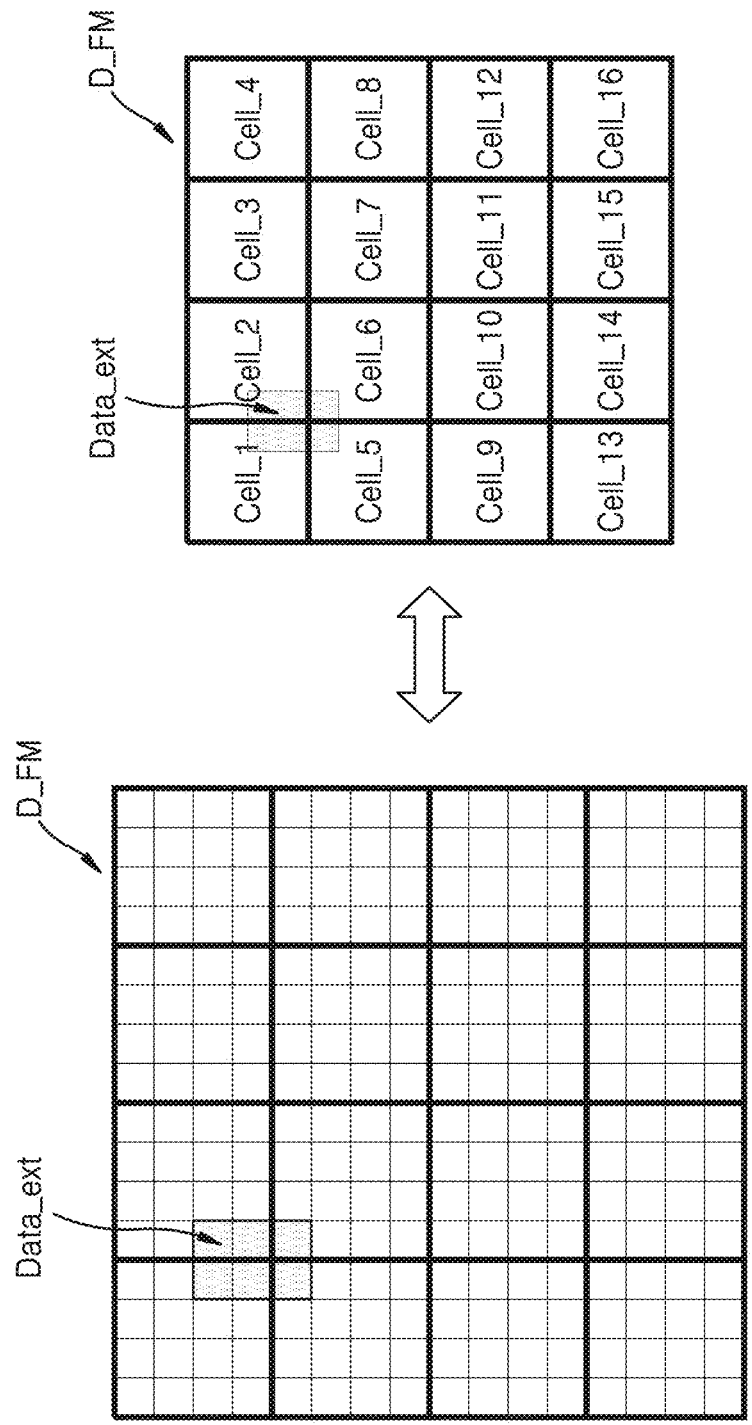
FIG. 12 illustrates feature map data and extracted data so as to explain a data extraction process according to an embodiment of the inventive concepts.

In operation S300, the neural network IC 100 may generate the extracted data Data_ext by rearranging the rows and/or columns of the first data D1. For example, the second multiplexing circuit 144 included in the multiplexing circuit 142 may generate the extracted data Data_ext by rotating the first data D1 in a vertical direction and/or a horizontal direction by using at least one multiplexer. In operation S400, the neural network IC 100 may perform a neural network operation by using the extracted data Data_ext. For example, the arithmetic circuit 160 may perform convolution by multiplying the extracted data Data_ext by weight values corresponding to the extracted data Data_ext and adding up results of the multiplications. FIG. 12 illustrates the feature map data D_FM and the extracted data Data_ext in order to explain a data extracting process according to an embodiment of the inventive concepts. In particular, FIG. 12 illustrates pieces of data for explaining an embodiment in which a window size necessary for a computation is less than a size of each cell. For convenience of explanation, FIG. 12 illustrates an embodiment in which the feature map data D_FM includes 16 cells each including 16 features and a window size necessary for a computation is a 3×2 size, but the number of cells, the number of features, and the window size are merely examples. Thus, embodiments of the inventive concepts are not limited thereto. FIG. 12 will now be described with reference to FIGS. 5 and 6.

When the neural network IC 100 performs a neural network operation (for example, convolution) based on a data feature map, the arithmetic circuit 160 may need the extracted data Data_ext from among the feature map data D_FM. In this case, the data extraction circuit 140 may extract the extracted data Data_ext from the feature map data D_FM.

The feature map data D_FM may include first through sixteenth cells Cell_1 through Cell_16. The feature map data D_FM may be stored as the first through sixteenth cells Cell_1 through Cell_16 in the data buffer 141. A portion of the extracted data Data_ext necessary for the neural network operation is included in the first cell Cell_1, another portion thereof is included in the second cell Cell_2, another portion thereof is included in the fifth cell Cell_5, and another portion thereof is included in the sixth cell Cell_6. A process of extracting the extracted data Data_ext of FIG. 12 from the feature map data D_FM of FIG. 12 will now be described with reference to FIGS. 14A through 14C.

Figure 13A:
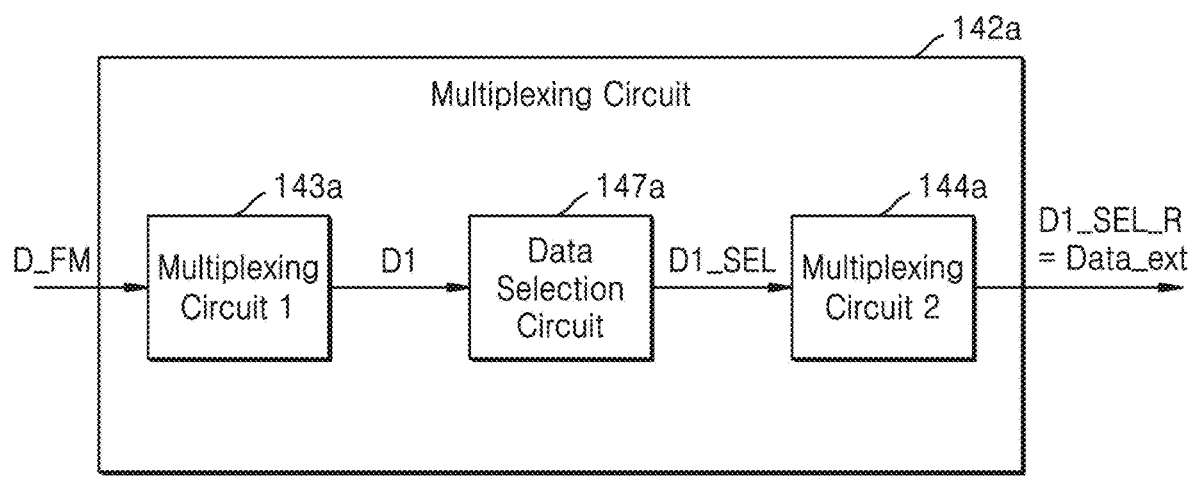
FIGS. 13A through 13C are block diagrams of multiplexing circuits according to an embodiment of the inventive concepts.
Figure 13B:
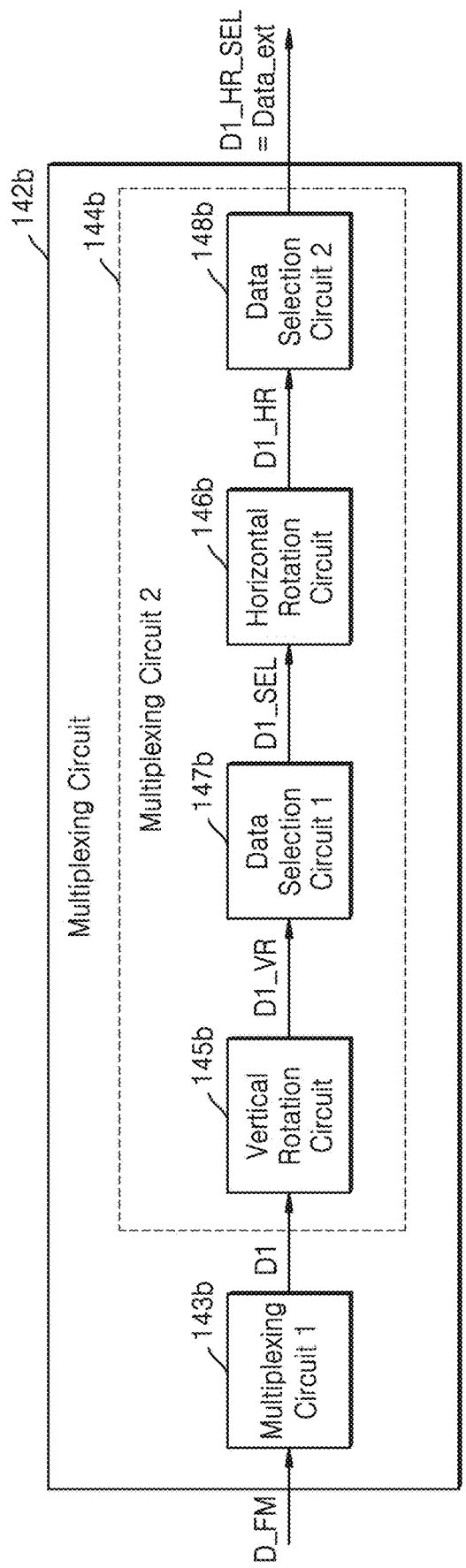
Figure 13C:
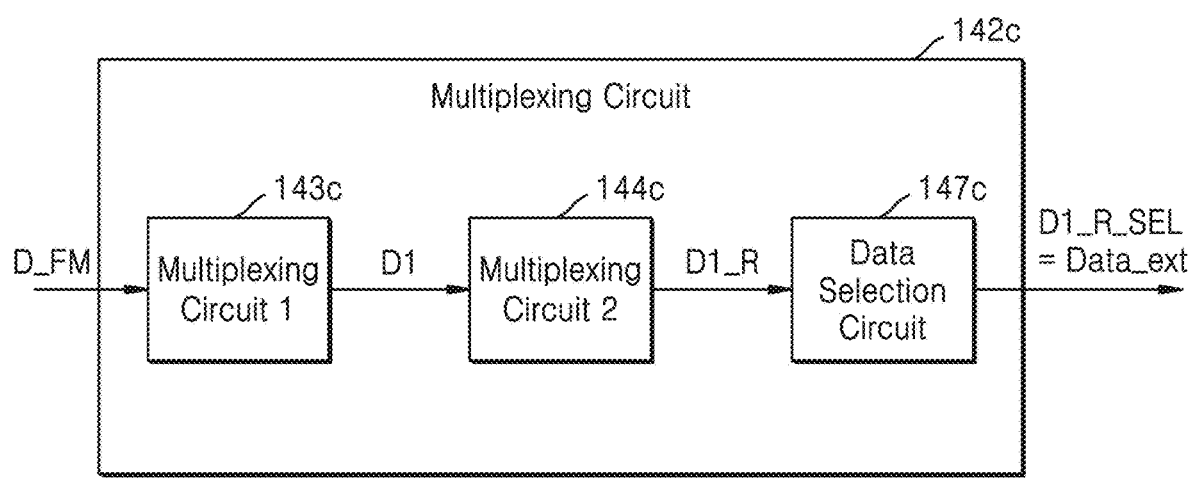

FIGS. 13A through 13C are block diagrams of multiplexing circuits 142a, 142b, and 142c according to an embodiment of the inventive concepts.

Referring to FIG. 13A, the multiplexing circuit 142a may include a first multiplexing circuit 143a, a second multiplexing circuit 144a, and/or a data selection circuit 147a. The first multiplexing circuit 143a and the second multiplexing circuit 144a may be substantially the same as the first multiplexing circuit 143 and the second multiplexing circuit 144 of FIG. 6. The first multiplexing circuit 143a may generate the first data D1 by extracting data from the feature map data D_FM. The data selection circuit 147a may generate selected first data D1_SEL by selecting only data necessary for a computation except for data unnecessary for the computation from the first data D1. The second multiplexing circuit 144a may generate extracted data Data_ext by rotating the selected first data D1_SEL in a vertical direction and/or a horizontal direction. Pieces of data corresponding to the embodiment of FIG. 13A are shown in FIG. 14A.

Referring to FIG. 13B, the multiplexing circuit 142b may include a first multiplexing circuit 143b and/or a second multiplexing circuit 144b, and the second multiplexing circuit 144b may include a vertical rotation circuit 145b, a horizontal rotation circuit 146b, a first data selection circuit 147b, and/or a second data selection circuit 148b. The first multiplexing circuit 143b, the vertical rotation circuit 145b, and the horizontal rotation circuit 146b may be substantially the same as the first multiplexing circuit 143, the vertical rotation circuit 145, and the horizontal rotation circuit 146 described above with reference to the preceding drawings, respectively. The first multiplexing circuit 143a may generate the first data D1 by extracting data from the feature map data D_FM. The vertical rotation circuit 145b may generate the vertically-rotated first data D1_VR by rotating the first data D1 in a vertical direction. The first data selection circuit 147b may generate selected first data D1_SEL by selecting only rows necessary for a computation except for rows unnecessary for the computation from the vertically-rotated first data D1_VR. The horizontal rotation circuit 146b may generate horizontally-rotated first data D1_HR by rotating the selected first data D1_SEL in a horizontal direction. The second data selection circuit 148b may generate extracted data Data_ext by selecting only columns necessary for the computation except for columns unnecessary for the computation from the horizontally-rotated first data D1_HR. Pieces of data corresponding to the embodiment of FIG. 13B are shown in FIG. 14B.

Referring to FIG. 13C, the multiplexing circuit 142c may include a first multiplexing circuit 143c, a second multiplexing circuit 144c, and/or a data selection circuit 147c. The first multiplexing circuit 143c and the second multiplexing circuit 144c may be substantially the same as the first multiplexing circuit 143 and the second multiplexing circuit 144 described above with reference to the preceding drawings, respectively. The first multiplexing circuit 143c may generate the first data D1 by extracting data from the feature map data D_FM. The second multiplexing circuit 144c may generate rotated first data D1_R by rotating the first data D1 in a vertical direction and/or a horizontal direction. The data selection circuit 147c may generate extracted data Data_ext by selecting only data necessary for a computation except for data unnecessary for the computation from the rotated first data D1_R. Pieces of data corresponding to the embodiment of FIG. 13C are shown in FIG. 14C.

Figure 14A:
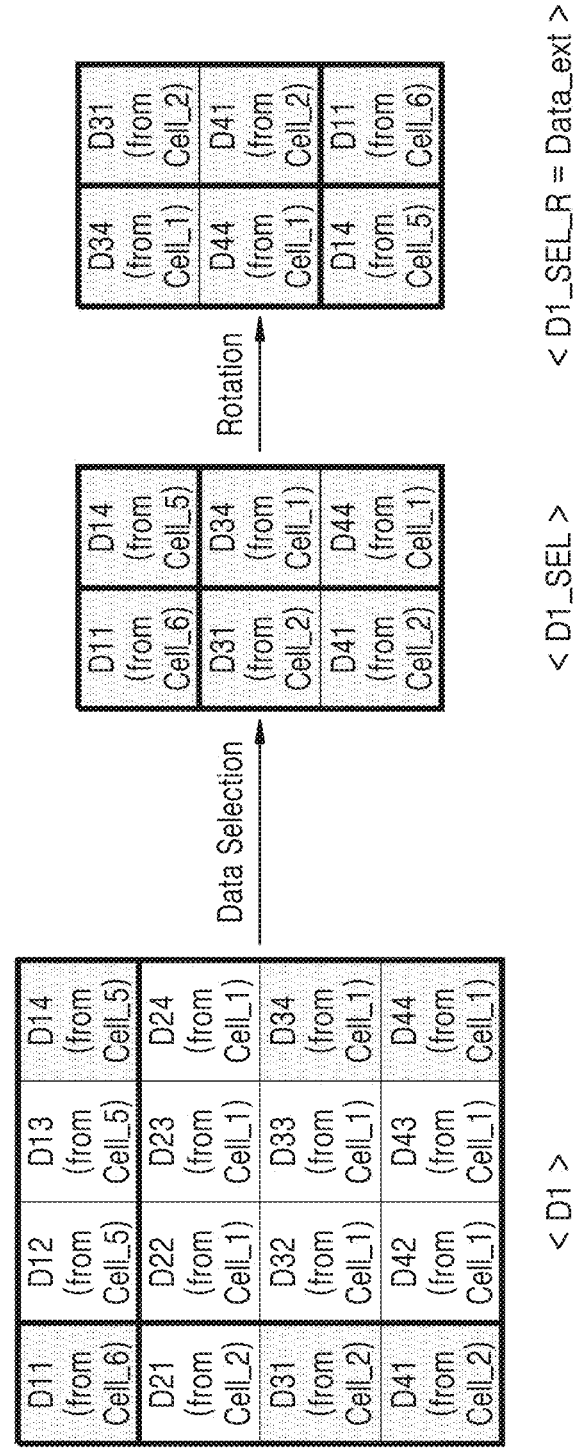
FIGS. 14A through 14C illustrate pieces of data in a matrix form so as to explain a data selection and extraction method performed by the multiplexing circuits of FIGS. 13A through 13C, respectively, according to an embodiment of the inventive concepts.
Figure 14B:
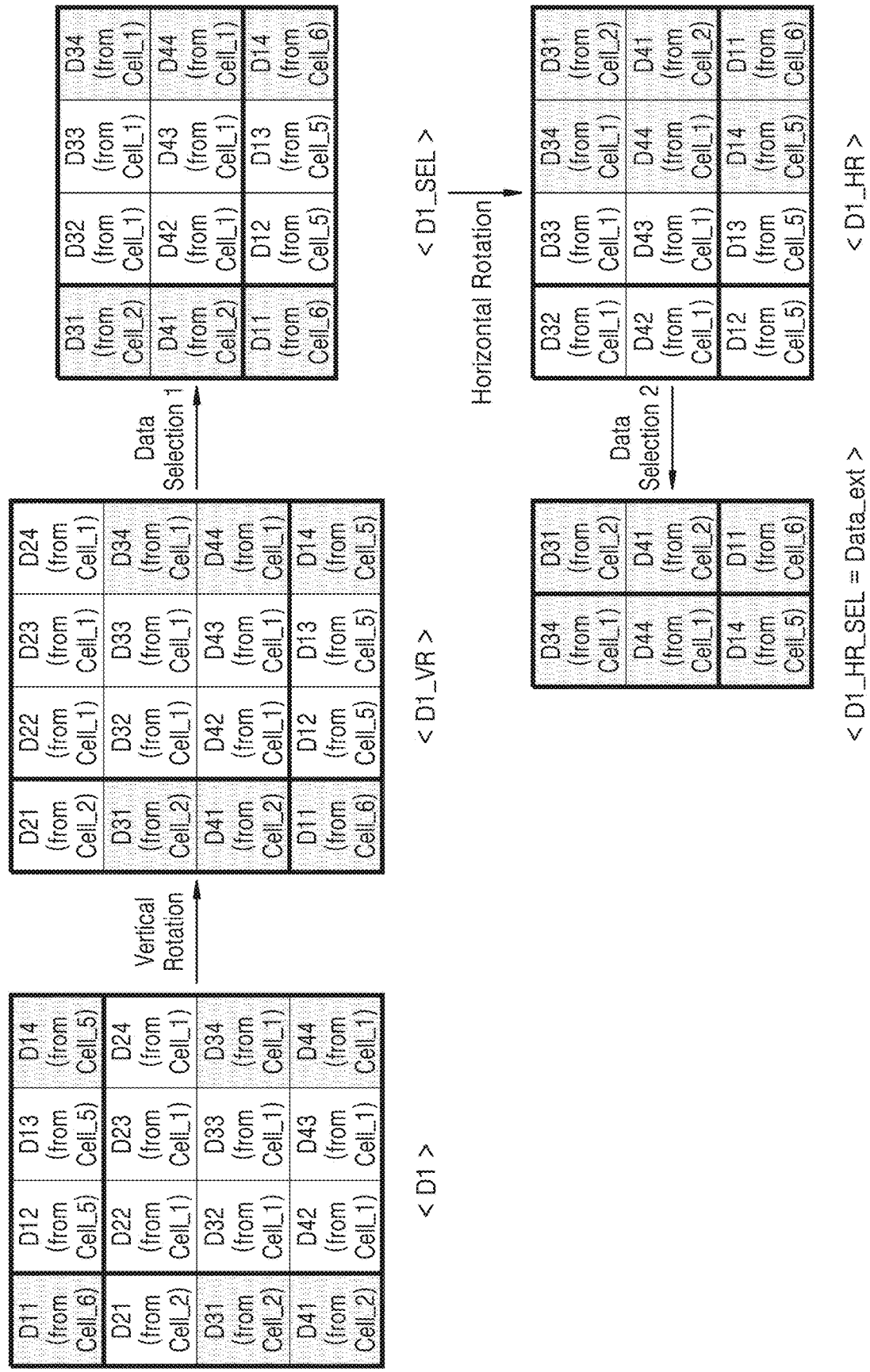
Figure 14C:
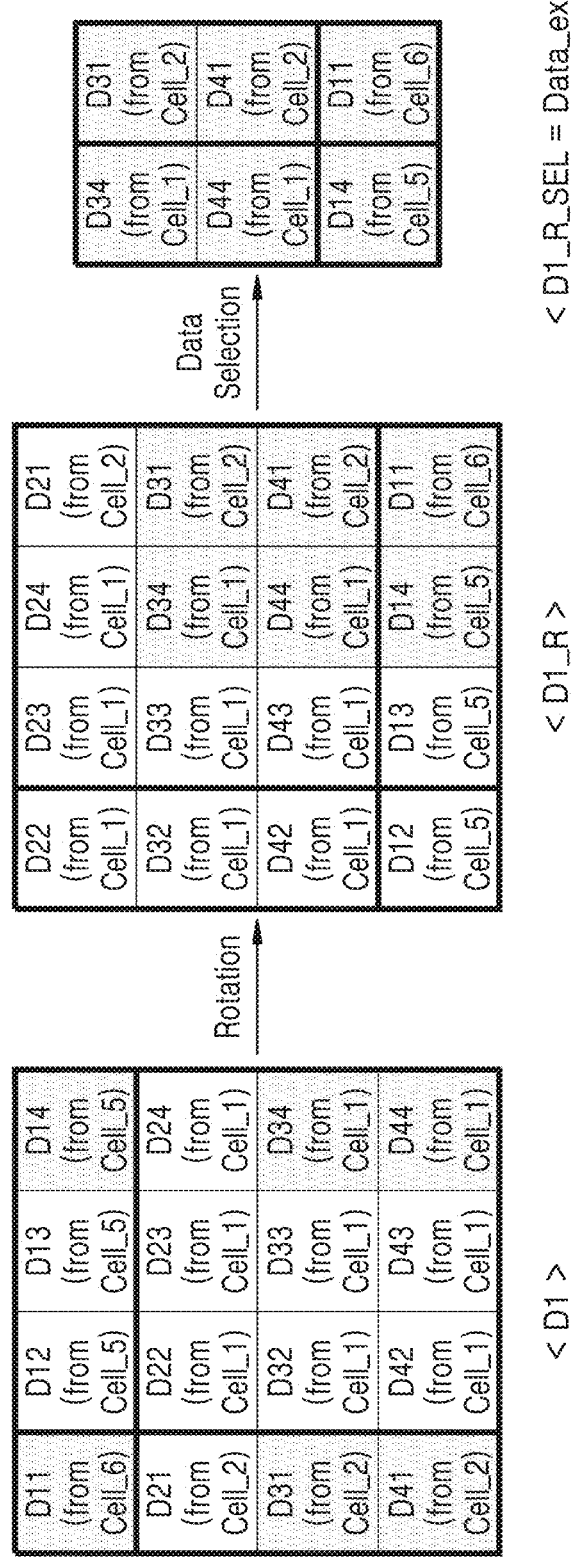

FIGS. 14A through 14C illustrate pieces of data in a matrix form in order to explain a data selecting and extracting method performed by the multiplexing circuits 142a, 142b, and 142c of FIGS. 13A through 13C, respectively, according to an embodiment of the inventive concepts.

FIG. 14A will now be described with reference to FIG. 13A. The first data D1 generated by the first multiplexing circuit 142a may include pieces of data (non-shaded portion) unnecessary for a computation. The data selection circuit 147a may generate the extracted data Data_ext by selecting only pieces of data D11, D14, D31, D34, D41, and D44 necessary for a computation except for pieces of data D12, D13, D21, D22, D23, D24, D32, D33, D42, and D43 unnecessary for the computation from the first data D1.

FIG. 14B will now be described with reference to FIG. 13B. The first data D1 generated by the first multiplexing circuit 142b may include pieces of data (non-shaded portion) unnecessary for a computation. The vertical rotation circuit 145b may generate the vertically-rotated first data D1_VR by rotating the first data D1 in a vertical direction. The first data selection circuit 147b may generate the selected first data D1_SEL by excluding a first row unnecessary for the computation from the vertically-rotated first data D1_VR. The horizontal rotation circuit 146b may generate the horizontally-rotated first data D1_HR by rotating the selected first data D1_SEL in a horizontal direction. The second data selection circuit 148b may generate the extracted data Data_ext by excluding second and third columns unnecessary for the computation from the horizontally-rotated first data D1_HR. FIG. 14C will now be described with reference to FIG. 13C. The first data D1 generated by the first multiplexing circuit 142c may include pieces of data (non-shaded portion) unnecessary for a computation. The second multiplexing circuit 143c may generate the rotated first data D1_R by rotating the first data D1 in a vertical direction and/or a horizontal direction. The data selection circuit 147c may generate the extracted data Data_ext by selecting only pieces of data D11, D14, D31, D34, D41, and D44 necessary for a computation except for pieces of data D12, D13, D21, D22, D23, D24, D32, D33, D42, and D43 unnecessary for the computation from the rotated first data D1_R.

The inventive concepts have been particularly shown and described with reference to example embodiments thereof. The terminology used herein is for the purpose of describing example embodiments only and is not intended to be limiting of the inventive concepts. Thus, it will be understood that various changes in form and details may be made therein without departing from the spirit and scope of the inventive concepts as defined by the appended claims.

What is claimed is:

1. An integrated circuit included in a device for performing a neural network operation, the integrated circuit comprising:
 a buffer configured to store feature map data in units of cells each comprising at least one feature, each of the at least one feature of each cell corresponding to a coordinate value, wherein the feature map data is for use in the neural network operation; and
 a multiplexing circuit including at least one multiplexer, the multiplexing circuit being configured to
  receive the feature map data from the buffer,
  extract feature data from each cell, the at least one multiplexer being configured to extract each of the at least one feature of each cell corresponding to an identical coordinate value, and
  output the extracted feature data.

2. The integrated circuit of claim 1, wherein the multiplexing circuit is configured to generate first data by extracting, from a plurality of the cells, pieces of feature data corresponding to all coordinate values of the first data, and generate the extracted feature data by rotating the first data in at least one of a vertical direction and a horizontal direction.

3. The integrated circuit of claim 1, wherein the multiplexing circuit comprises:
- a first multiplexing circuit comprising the at least one multiplexer for extracting feature data of one of features included in a plurality of the cells and each corresponding to a first coordinate value, and configured to output first data based on the extracted feature data; and
- a second multiplexing circuit comprising a plurality of multiplexers for receiving the first data from the first multiplexing circuit and rotating the first data in a vertical direction or a horizontal direction.

4. The integrated circuit of claim 3, wherein the first multiplexing circuit comprises a plurality of multiplexers configured to select one input signal from among input signals, a number of which corresponds to the number of the cells included in the feature map data.

5. The integrated circuit of claim 4, wherein the first multiplexing circuit comprises multiplexers, the number of which corresponds to the number of the at least one feature included in each cell.

6. The integrated circuit of claim 3, wherein the second multiplexing circuit comprises:
- a vertical rotation circuit configured to rotate the first data in the vertical direction by changing an order of rows of the first data in a matrix form, and generate vertically rotated first data; and
- a horizontal rotation circuit configured to rotate the vertically rotated first data in the horizontal direction by changing an order of columns of the vertically rotated first data, and generate the extracted feature data.

7. The integrated circuit of claim 6, wherein
the vertical rotation circuit comprises multiplexers, a number of which corresponds to the number of the rows of the first data, and
the horizontal rotation circuit comprises multiplexers, a number of which corresponds to the number of the columns of the first data.

8. The integrated circuit of claim 7, wherein
the multiplexers included in the vertical rotation circuit are configured to select different rows of the rows of the first data, respectively, and
the multiplexers included in the horizontal rotation circuit are configured to select different columns of the columns of the first data, respectively.

9. The integrated circuit of claim 1, wherein
the neural network operation comprises a convolution operation,
the feature map data comprises input feature map data on which the convolution operation is to be performed, and
the extracted feature data is data that is to be directly multiplied by a weight during the convolution operation.

* * * * *